United States Patent
Iwasaki et al.

(10) Patent No.: US 10,541,442 B2
(45) Date of Patent: Jan. 21, 2020

(54) BATTERY, BATTERY PACK, AND VEHICLE

(71) Applicant: KABUSHIKI KAISHA TOSHIBA, Minato-ku (JP)

(72) Inventors: Takuya Iwasaki, Uenohara (JP); Norio Takami, Yokohama (JP)

(73) Assignee: KABUSHIKI KAISHA TOSHIBA, Minato-ku (JP)

(*) Notice: Subject to any disclaimer, the term of this patent is extended or adjusted under 35 U.S.C. 154(b) by 274 days.

(21) Appl. No.: 15/455,992

(22) Filed: Mar. 10, 2017

(65) Prior Publication Data
US 2017/0271714 A1 Sep. 21, 2017

(30) Foreign Application Priority Data
Mar. 17, 2016 (JP) ................. 2016-053367

(51) Int. Cl.
*H01M 10/0562* (2010.01)
*B60L 11/18* (2006.01)
(Continued)

(52) U.S. Cl.
CPC ....... *H01M 10/0562* (2013.01); *H01M 2/305* (2013.01); *H01M 4/131* (2013.01); *H01M 4/366* (2013.01); *H01M 4/485* (2013.01); *H01M 4/505* (2013.01); *H01M 4/525* (2013.01); *H01M 4/587* (2013.01); *H01M 4/623* (2013.01);
(Continued)

(58) Field of Classification Search
CPC ......... H01M 10/0562; H01M 10/0567; H01M 10/0568; H01M 10/0569; H01M 10/0564; H01M 4/622; H01M 2/1016; H01M 2/0237; H01M 2/0217; H01M 10/0565
See application file for complete search history.

(56) References Cited

U.S. PATENT DOCUMENTS

2008/0070115 A1  3/2008  Saruwatari et al.
2010/0092871 A1  4/2010  Medlege et al.
(Continued)

FOREIGN PATENT DOCUMENTS

JP   7-54715      6/1995
JP   2008-135287  6/2008
(Continued)

OTHER PUBLICATIONS

Extended European Search Report dated Apr. 25, 2017 in Patent Application No. 17158661.3.

*Primary Examiner* — Ula C Ruddock
*Assistant Examiner* — Matthew W Van Oudenaren
(74) *Attorney, Agent, or Firm* — Oblon, McClelland, Maier & Neustadt, L.L.P.

(57) ABSTRACT

According to one embodiment, a battery is provided. The battery includes one or more electrode stack. The one or more electrode stack includes an electrolyte layer, a first electrode layer, and a second electrode layer. The electrolyte layer includes an electrolyte and a carboxymethylcellulose sodium salt. The first electrode layer includes a first active material and a carboxymethylcellulose ammonium salt. The second electrode layer includes a second active material and a first binder soluble in an organic solvent. The first electrode layer is bound to a first surface of the electrolyte layer. The second electrode layer is bound to a second surface of the electrolyte layer on a reverse side to the first surface.

13 Claims, 5 Drawing Sheets

(51) Int. Cl.
| | |
|---|---|
| *H01M 10/0525* | (2010.01) |
| *H01M 10/0568* | (2010.01) |
| *H01M 10/0569* | (2010.01) |
| *H01M 10/0587* | (2010.01) |
| *H01M 10/42* | (2006.01) |
| *H01M 2/30* | (2006.01) |
| *H01M 4/131* | (2010.01) |
| *H01M 4/36* | (2006.01) |
| *H01M 4/485* | (2010.01) |
| *H01M 4/505* | (2010.01) |
| *H01M 4/525* | (2010.01) |
| *H01M 4/587* | (2010.01) |
| *H01M 4/62* | (2006.01) |
| *H01M 4/66* | (2006.01) |
| *H01M 10/0567* | (2010.01) |
| *H01M 10/0565* | (2010.01) |
| *H01M 10/0564* | (2010.01) |
| *H01M 4/04* | (2006.01) |
| *H01M 4/1391* | (2010.01) |
| *H01M 4/02* | (2006.01) |

(52) U.S. Cl.
CPC ........... *H01M 4/625* (2013.01); *H01M 4/661* (2013.01); *H01M 10/0568* (2013.01); *H01M 10/0569* (2013.01); *H01M 10/0587* (2013.01); *H01M 4/043* (2013.01); *H01M 4/0404* (2013.01); *H01M 4/0407* (2013.01); *H01M 4/0471* (2013.01); *H01M 4/1391* (2013.01); *H01M 4/622* (2013.01); *H01M 10/0525* (2013.01); *H01M 10/0564* (2013.01); *H01M 10/0565* (2013.01); *H01M 10/0567* (2013.01); *H01M 10/4257* (2013.01); *H01M 2004/021* (2013.01); *H01M 2004/027* (2013.01); *H01M 2004/028* (2013.01); *H01M 2010/4278* (2013.01); *H01M 2220/20* (2013.01); *H01M 2300/0037* (2013.01); *H01M 2300/0068* (2013.01)

(56) References Cited

U.S. PATENT DOCUMENTS

| | | |
|---|---|---|
| 2011/0074204 A1* | 3/2011 | Kim .................. B60L 7/12 303/3 |
| 2011/0151317 A1* | 6/2011 | Giroud ................ H01B 1/122 429/162 |
| 2012/0315541 A1 | 12/2012 | Sasaki et al. |
| 2013/0106029 A1* | 5/2013 | Snyder ................ H01M 4/043 264/571 |
| 2014/0065489 A1 | 3/2014 | Saimen et al. |
| 2014/0082931 A1 | 3/2014 | Nishino et al. |
| 2014/0193689 A1 | 7/2014 | Takami et al. |
| 2014/0295230 A1* | 10/2014 | Ishibashi ............. H01M 4/485 429/90 |
| 2015/0171394 A1 | 6/2015 | Hoshiba et al. |
| 2015/0194640 A1* | 7/2015 | Tsukuda ............ H01M 10/0413 429/178 |
| 2016/0351906 A1 | 12/2016 | Yokoi et al. |

FOREIGN PATENT DOCUMENTS

| | | | |
|---|---|---|---|
| JP | 2010-32349 | | 2/2010 |
| JP | 2012-150905 A | | 8/2012 |
| JP | 2012150905 | * | 8/2012 |
| JP | 2012-243476 A | | 12/2012 |
| JP | 2012-243737 A | | 12/2012 |
| JP | 2014-135287 | | 7/2014 |
| JP | 2014-222649 | | 11/2014 |
| JP | 2015-88460 | | 5/2015 |
| JP | 2015-115266 A | | 6/2015 |
| JP | 2015115266 | * | 6/2015 |
| WO | WO 2011/122297 A1 | | 10/2011 |
| WO | WO 2012/164723 A1 | | 12/2012 |
| WO | WO 2013/140565 A1 | | 9/2013 |
| WO | WO 2015/115053 A1 | | 8/2015 |

* cited by examiner

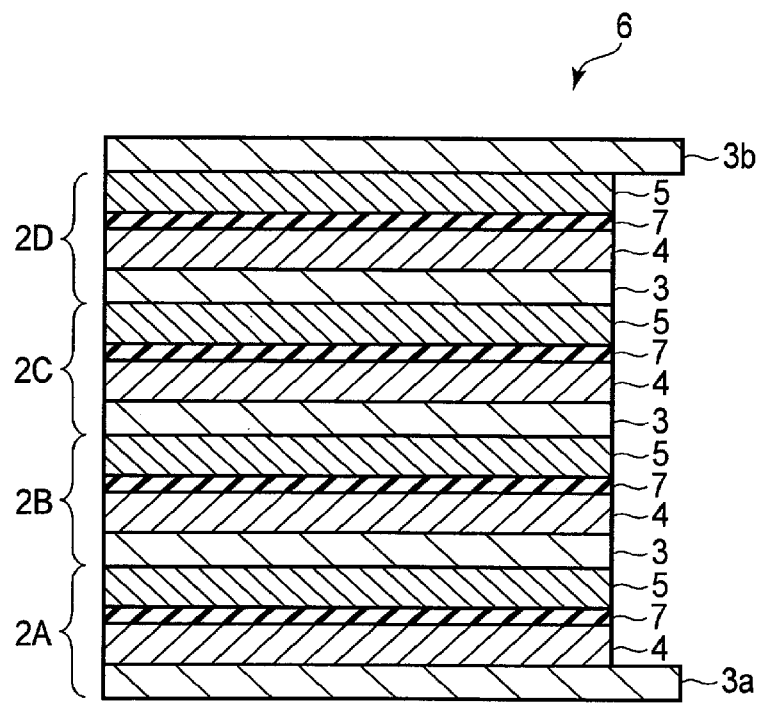
F I G. 1
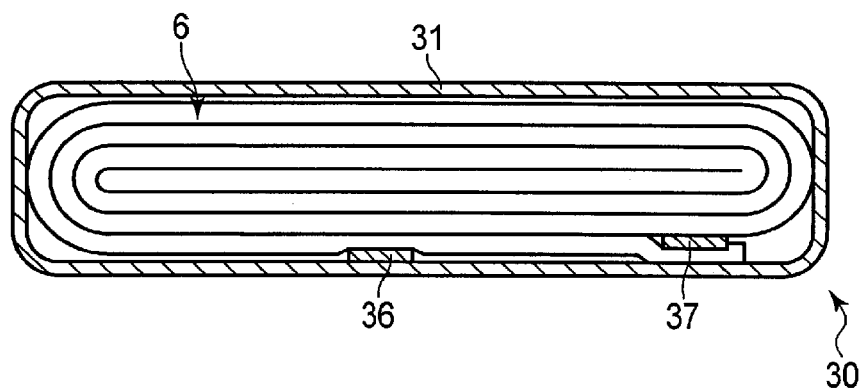
F I G. 2

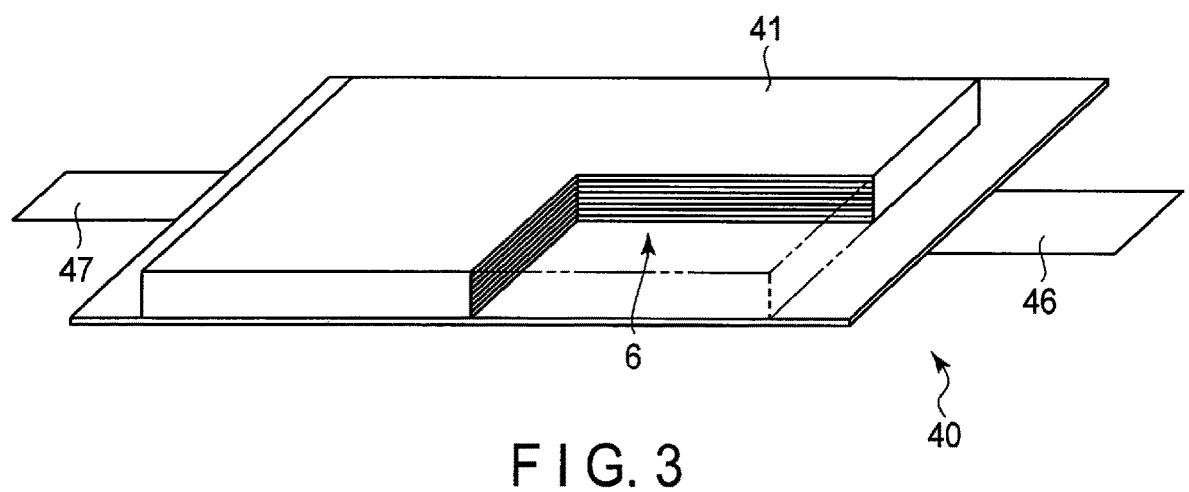
F I G. 3
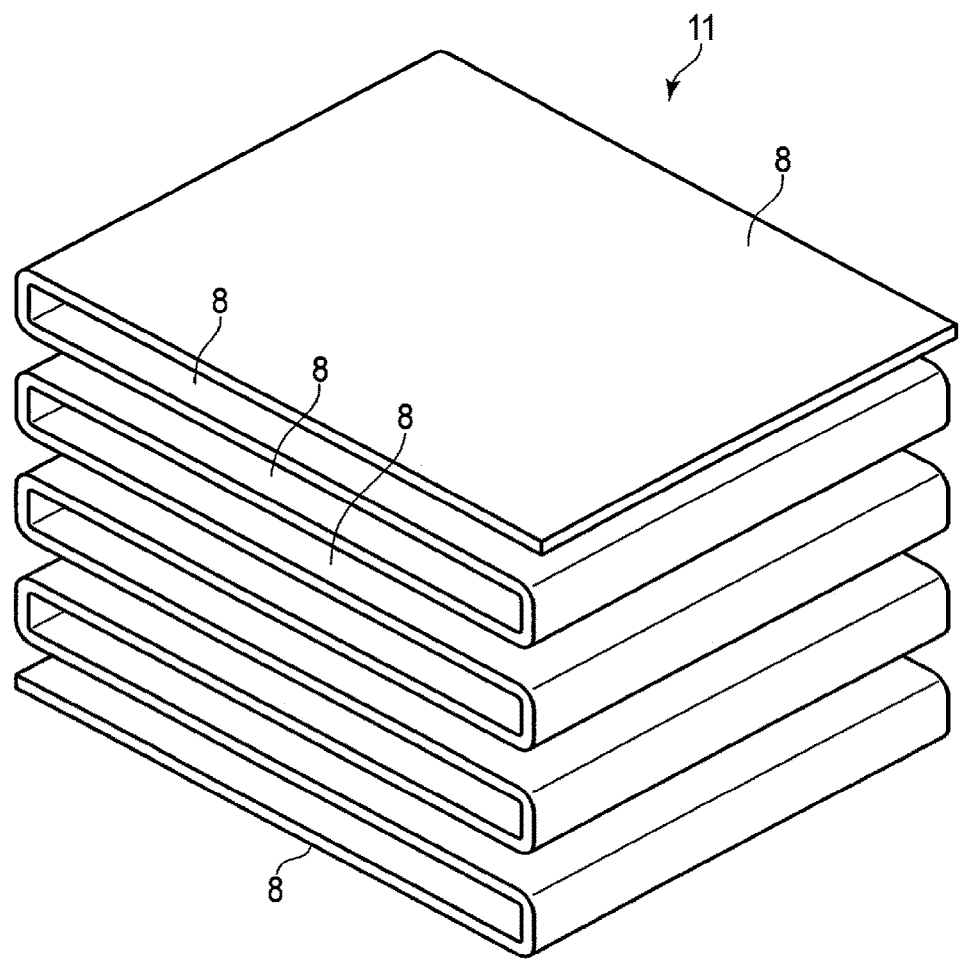
F I G. 4

BATTERY, BATTERY PACK, AND VEHICLE

CROSS-REFERENCE TO RELATED APPLICATION

This application is based upon and claims the benefit of priority from Japanese Patent Application No. 2016-53367, filed Mar. 17, 2016; the entire contents of which is incorporated herein by reference.

FIELD

Embodiments described herein relate generally to a battery, a battery pack, and a vehicle.

BACKGROUND

A lithium ion nonaqueous electrolyte secondary battery has achieved widespread use in various fields such as electric vehicles, power storage, and information devices as a high energy-density battery. Accordingly, market requirements for the nonaqueous electrolyte secondary battery grow further and research thereon is actively conducted.

Among others, for use as an electric source for vehicles such as electric vehicles, a lithium ion nonaqueous electrolyte secondary battery is required to have a high energy density, that is, a large discharge capacity per unit weight or unit volume.

On the other hand, requirements of safety grow along with an increasing discharge capacity per unit weight or unit volume. One answer thereto is an all-solid-state secondary battery. The all-solid-state secondary battery is a secondary battery literally using a solid electrolyte, instead of the conventional nonaqueous electrolyte, that is, an organic electrolyte solution. The organic electrolyte solution is inflammable and thus, development of technology is actively under development to improve safety when the organic electrolyte solution is used. Nevertheless, it is difficult to ensure sufficient safety. On the other hand, since the all-solid-state secondary battery does not use any organic electrolyte solution, the all-solid-state secondary battery is not apt to ignite, and therefore can form an extremely safe secondary battery.

Further, according to the all-solid-state secondary battery, since no electrolyte solution is used, there can suitably be formed an electrode in a bipolar structure obtained by applying a positive electrode and a negative electrode to the front side and the back side of a current collector, and a bipolar battery obtained by stacking such electrodes after coating a solid electrolyte thereon. In such a bipolar battery, the voltage can be made high within a cell.

BRIEF DESCRIPTION OF THE DRAWINGS

FIG. 1 shows an exemplary electrode group according to an embodiment;

FIG. 2 is a schematic sectional view of an exemplary battery according to a first embodiment;

FIG. 3 is a partially cut-out perspective view of another exemplary battery according to the first embodiment;

FIG. 4 shows an electrode stack in an exemplary aspect according to an embodiment;

DETAILED DESCRIPTION

Figure 5:
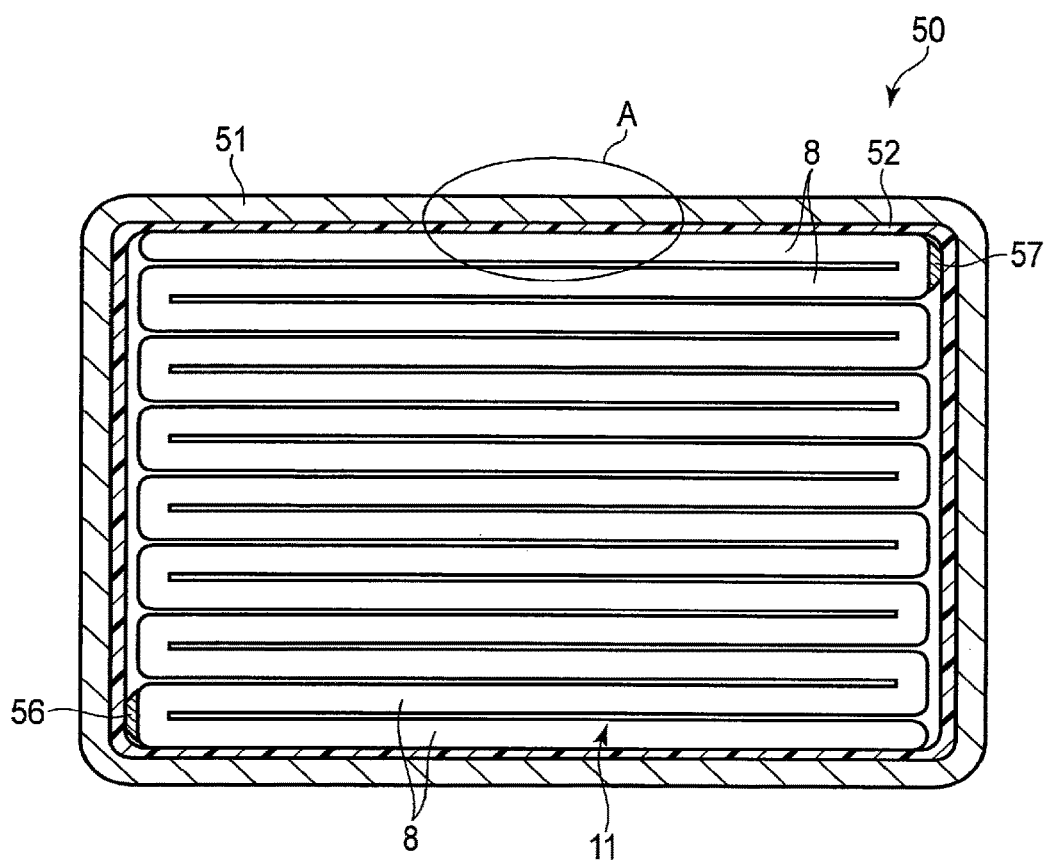
FIG. 5 is a schematic sectional view of still another exemplary electrode according to the first embodiment.

According to one aspect of a first embodiment, a battery is provided. The battery includes one or more electrode stack. The one or more electrode stack includes an electrolyte layer, a first electrode layer, and a second electrode layer. The electrolyte layer includes an electrolyte and a carboxymethylcellulose sodium salt. The first electrode layer includes a first active material and a carboxymethylcellulose ammonium salt. The second electrode layer includes a second active material and a first binder soluble in an organic solvent. The first electrode layer is bound to a first surface of the electrolyte layer. The second electrode layer is bound to a second surface of the electrolyte layer on a reverse side to the first surface.

According to another aspect of the first embodiment, a battery is provided. The battery includes one or more electrode stack. The one or more electrode stack includes an electrolyte layer, a first electrode layer, and a second electrode layer. The electrolyte layer includes an electrolyte and a carboxymethylcellulose ammonium salt. The first electrode layer includes a first active material and a carboxymethylcellulose sodium salt. The second electrode layer includes a second active material and a first binder soluble in an organic solvent. The first electrode layer is bound to a first surface of the electrolyte layer. The second electrode layer is bound to a second surface of the electrolyte layer on a reverse side to the first side.

According to a second embodiment, a battery pack is provided. The battery pack includes a battery according to the first embodiment.

According to a third embodiment, a vehicle is provided. The vehicle includes a battery pack according to the second embodiment.

When producing an electrode in a bipolar structure, it is necessary to take precaution with regard to the type of binder used for a slurry including a solid electrolyte in accordance with the type of binder used for the positive electrode and/or the negative electrode, when applying the solid electrolyte to the surface of the positive electrode and/or the surface of the negative electrode. For example, in the case that a binder soluble in an organic solvent (so-called solvent binder) is used for the positive electrode and/or the negative electrode, it is necessary to use a water-soluble binder (so-called water borne binder) for the application of solid electrolyte slurry. On the other hand, when a water-soluble binder is used for the positive electrode and/or the negative electrode, it is necessary to use a binder soluble in an organic solvent for the application of solid electrolyte slurry.

When a positive electrode and a negative electrode are formed respectively on the front side and the back side (reverse sides) of a current collector, it is necessary to apply a coat of one electrode material to the surface of the front side of the current collector and wait for the coat to dry and then, apply a coat of the other electrode material to the surface of the back side (reverse side). When an electrode in the bipolar structure is produced in this manner, it is difficult to improve manufacturing efficiency and limit manufacturing costs. Furthermore, the necessity to flip the current collector after forming an electrode on the surface of the front side of the current collector, in order to apply a coat of the material of the other electrode, is a factor unfavorable for manufacturing efficiency and manufacturing costs.

Embodiments will be explained below with reference to the drawings. Structures common among the embodiments are represented by the same symbols and over-lapping explanations are omitted. Also, each drawing is a typical view for explaining the embodiments and for promoting an understanding of the embodiments. Though there are parts different from an actual device in shape, dimension and ratio, these structural designs may be properly changed taking the following explanations and known technologies into consideration.

(First Embodiment)

According to one aspect of a first embodiment, a battery including one or more electrode stack is provided. The one or more electrode stack includes an electrolyte layer, a first electrode layer, and a second electrode layer. The electrolyte layer includes an electrolyte and a carboxymethylcellulose sodium salt. The first electrode layer includes a first active material and a carboxymethylcellulose ammonium salt and is bound to one surface (a first surface) of the electrolyte layer. The second electrode layer includes a second active material and a first binder soluble in an organic solvent, and the second electrode layer is bound to the surface (a second surface) opposite to the surface on which the first electrode layer is bound to the electrolyte layer. In other words, the first electrode layer and second electrode layer are respectively bound to reverse surfaces of the electrolyte layer.

According to another aspect of the first embodiment, a battery including one or more electrode stack is provided. The one or more electrode stack includes an electrolyte layer, a first electrode layer, and a second electrode layer. The electrolyte layer includes an electrolyte and a carboxymethylcellulose ammonium salt. The first electrode layer includes a first active material and a first binder soluble in an organic solvent, and the first electrode layer is bound to one surface (a first surface) of the electrolyte layer. The second electrode layer includes a second active material and a carboxymethylcellulose sodium salt, and the second electrode layer is bound to the surface (a second surface) opposite to the surface on which the first electrode layer is bound to the electrolyte layer. In other words, the first electrode layer and second electrode layer are respectively bound to reverse surfaces of the electrolyte layer.

The battery according to the first embodiment can further include a container member and an electrode terminal. The battery according to the first embodiment can also include an electrolyte solution including a fluid solvent and an electrolyte.

The electrode stack includes an electrolyte layer, a first electrode layer, and a second electrode layer. The electrolyte layer, the first electrode layer, and the second electrode layer are in close contact, thereby configuring an integrated unit. The first electrode layer and the second electrode layer are respectively bound to surfaces on reverse sides of the electrolyte layer (a first surface and a second surface of the electrolyte layer).

The first electrode layer is not simply disposed on the surface of the electrolyte layer, but the first electrode layer and the electrolyte layer are in close contact without virtually any gap. A depressed portion or an irregular structure may be present on the surface of the first electrode layer, but the electrolyte layer is in contact with the first electrode layer is such a way that depressions on the surface of the first electrode layer are filled in by the electrolyte layer. That is, at the interface between the first electrode layer and the electrolyte layer, the surface of the electrolyte layer has a shape that follows along the surface shape of the first electrode layer. Thus, the surface of the electrolyte layer conforms to the surface of the first electrode layer.

Similarly, the second electrode layer is not simply disposed on the surface of the electrolyte layer, but the second electrode layer and the electrolyte layer are in close contact without virtually any gap. A depressed portion or an irregular structure may be present on the surface of the electrolyte layer, but the second electrode layer is in contact with the electrolyte layer is such a way that depressions on the surface of the electrolyte layer are filled in by the second electrode layer. That is, at the interface between the electrolyte layer and the second electrode layer, the surface of the second electrode layer has a shape that follows along the surface shape of the electrolyte layer. Thus, the surface of the second electrode layer conforms to the surface of the electrolyte layer.

The electrolyte layer includes an electrolyte described below and one of an ammonium salt and a sodium salt of carboxymethylcellulose (CMC) as a binder. The type of salt of CMC in the electrolyte layer may be different depending on the type of binder included in the first electrode layer and the second electrode layer.

The first electrode layer and the second electrode layer respectively include a first active material and a second active material. Also, either one of the first electrode layer and the second electrode layer may be a negative electrode layer or a positive electrode layer. When, for example, the first electrode layer is a negative electrode layer, the second electrode layer is a positive electrode layer. In this case, the first active material is a negative electrode active material described below and the second active material is a positive electrode active material described below. Alternatively, when, for example, the first electrode layer is a positive electrode layer, the second electrode layer is a negative electrode layer. In this case, the first active material is a positive electrode active material, and the second active material is a negative electrode active material.

The first electrode layer further includes as a binder, in addition to the first active material, one of an ammonium salt of carboxymethylcellulose (CMC) and a first binder soluble in an organic solvent. While details will be described below, one material, or two or more materials exhibiting solubility toward an organic solvent may be used as the first binder. When the first electrode layer includes a carboxymethylcellulose ammonium salt (hereinafter, "CMC ammonium salt"), the electrolyte layer desirably includes a carboxymethylcellulose sodium salt (hereinafter, "CMC sodium salt").

The second electrode layer includes, in addition to the second active material, a first binder soluble in an organic solvent or a CMC sodium salt as a binder. When the first electrode layer includes a CMC ammonium salt, the second electrode layer desirably includes the first binder. When the first electrode layer includes the first binder, the second electrode layer desirably includes the CMC sodium salt. Further, when the second electrode layer includes the CMC sodium salt, the electrolyte layer desirably includes the CMC ammonium salt. The second electrode layer may further include a conductive agent, as described below. When the conductive agent is included, at least a portion of the conductive agent is preferably exposed to the surface of the second electrode layer from the viewpoint of securing electric conductivity.

A battery according to an embodiment includes, as described above, an electrode stack including an electrolyte layer, a first electrode layer, and a second electrode layer, each of which include mutually different types of binder. The electrolyte layer, the first electrode layer, and the second electrode layer are highly in close contact to configure an integrated unit. Because the electrode stack is configured as described above, ionic conductivity between the first electrode layer, the electrolyte layer, and the second electrode layer is high. As a result, a battery including such an electrode stack exhibits excellent output performance and excellent life performance.

The electrode stack can further include a current collecting layer. The current collecting layer may be in contact with at least one of the first electrode layer and the second electrode layer. Also, as will be described below, a stacked electrode group may be configured by stacking plural electrode stacks. In such a stacked electrode group, each current collecting layer in the plural electrode stacks may be in contact with both of the first electrode layer and the second electrode layer.

As will be described below, the current collecting layer may be a current collector including a foil that includes a metal or an alloy, or a layer including a conductive agent and a second binder. When the current collecting layer is a current collector including a foil (current collecting foil), the second electrode layer desirably includes the conductive agent. When the conductive agent is uniformly dispersed inside the second electrode layer, a good conductive path is formed between the second electrode layer and the current collecting foil, and thus electric resistance inside the battery can be decreased, which is preferable.

The layer including a conductive agent and a second binder as a current collecting layer is, for example, as will be described below, a conductive layer formed by drying a conductive paste applied onto the second electrode layer. The conductive paste may include a conductive agent and a binder that are known, and also a known solvent to adjust the paste to a viscosity suitable for applying.

When a current collecting layer is formed by applying conductive paste onto the second electrode layer and drying the paste, adhesiveness between the second electrode layer and the current collecting layer can be improved. This is because, if irregularities are present on the surface of the second electrode layer, the conductive paste can conform to the surface shape of the second electrode layer. As a result, electric conductivity can be improved by decreasing contact resistance between the second electrode layer and the current collecting layer, which is preferable.

The electrode stack may be included in a battery as an electrode group. An electrode group may be formed by using one electrode stack, or two or more electrode stacks. That is, a battery may include a single-unit electrode group including one integrated unit of electrode stack, or a plural-unit electrode group obtained by stacking two or more integrated units.

When one electrode stack is used as an electrode group, for example, an electrode stack in which each of two current collecting layers is respectively arranged on the outer side of the first electrode layer and on the outer side of the second electrode layer may be used. Alternatively, such an electrode stack may be wound in a flat shape or folded in a zigzag shape and used as an electrode group. Alternatively, for example, an electrode stack, in which one current collecting layer is arranged on the outer side of one of either the first electrode layer or the second electrode layer, may be wound in a flat shape or folded in a zigzag shape and used as an electrode group. In any of these cases, it is desirable to adopt a form in which a current collecting layer is arranged on each of surfaces on both of the outermost reverse sides of the electrode group. The volume energy density can be increased by winding the electrode stack or folding the electrode stack in zigzag.

When an electrode group obtained by stacking two or more electrode stack units is used as an electrode group, similarly to the case of using a single unit, a stack may be used in which current collecting layers are each arranged on both the outer side of the first electrode layer and the outer side of the second electrode layer which are positioned at the outermost layer of the stack, or a stack may be used in which a current collecting layer is arranged only on one of either the outer side of the first electrode layer or the outer side of the second electrode layer which are positioned at the outermost layer of the stack. However, when, for example, plural units are stacked, it is desirable to dispose a current collecting layer between each unit to prevent a short-circuit from being caused by contact of the positive electrode layer of one unit and the negative electrode layer of another layer. Also, by disposing current collecting layers as such, an electrode group in a bipolar structure can be configured and a cell voltage can thus be improved, which is preferable. In any of these cases, the stack may be wound in a flat shape or folded in a zigzag shape, but it is desirable to adopt a form in which the current collecting layers are arranged on surfaces on both of the outermost reverse sides of the electrode group.

The battery according to an embodiment can further include an electrode pressing member. The electrode pressing member is configured to press an electrode stack or an electrode group obtained by stacking electrode stacks from both the first electrode layer side and the second electrode layer side.

When vibration caused by impact or the like from outside a battery is transferred to the inside of the battery, adhesiveness between layers in the electrode stack may be degraded. When an electrode group is configured by stacking electrode stack by winding or folding the electrode stack, or the electrode group is configured by stacking two or more electrode stacks, the first electrode layer and/or the second electrode layer and the current collecting layer, which is stacked so as to be in contact therewith, may become offset due to impact or vibration, thereby leading to degradation of adhesiveness. When adhesiveness is degraded, conductive paths inside the electrode stack decrease, and thus battery resistance may increase. Also, excellent output performance or life performance may not be obtained. When a conductive container, a container made of metal for example, is used as the container member housing an electrode group, as a result of offsetting inside the electrode group, a portion of the electrode group may come into contact with the inner surface of the container made of metal, leading to a short-circuit of the battery.

Further, when, for example, the vibration from outside continues over a long term, fine particles from the materials of the battery may flake off and get in between layers of the electrode group. When fine particles get in between layers, as a result of degradation of adhesiveness, battery resistance may increase, or excellent output performance or life performance may not be obtained. In addition, as a result of fine particles penetrating through the current collecting layer, a short-circuit between the positive electrode layer and the negative electrode layer may be caused.

By including the electrode pressing member, degradation of adhesiveness between layers in the electrode stack can be suppressed. The electrode pressing member may serve also as, for example, a container member described below. An example of the container member serving also as an electrode pressing member includes a flexible container member hermetically sealed in such a way that the internal pressure is smaller than the pressure outside the battery. For example, the electrode stack can be pressed from both sides by using a container member made of a flexible film such as a laminate film or a thin metal described below and performing vacuum suction after housing the electrode stack. Alternatively, a rigid container member having appropriate inside dimensions can be used as an electrode pressing member. The electrode stack (or the electrode group) can be pressed together from both sides by, for example, housing the electrode stack (or the electrode group) inside a metal can having an inside dimension width equal to the thickness of the electrode stack (or the electrode group) in the stacking direction.

Alternatively, an apparatus separate from the container member can be provided as the electrode pressing member. For example, a module that fixes the electrode stack from both sides of the electrode stack may be provided. Also, electrode stack may be stacked and then, wound around by an insulating tape. When the insulating tape is used, in a case of using, for example, a container made of metal as the container member housing the electrode group, the insulating tape can also serve as an insulating member to prevent electric contact between the electrode group and the container made of metal.

Hereinafter, the negative electrode layer, the positive electrode layer, the electrolyte layer, and the current collecting layer will be described in detail. Also, the container member, the electrode terminal, and the electrolyte solution that can be included in a battery will be described.

1) Negative Electrode Layer

In a battery according to an embodiment, at least one of the first electrode layer and the second electrode layer may be a negative electrode layer. The negative electrode layer includes a negative electrode active material (the first active material or the second active material) and a binder. Though different depending on the aspect, the binder includes CMC ammonium salt, CMC sodium salt, or the first binder soluble in an organic solvent. The binder may further include a water borne emulsion binder such as styrene-butadiene rubber (SBR).

The negative electrode layer can further include a conductive agent.

The number of kinds of the negative electrode active material included in the negative electrode layer may be one or may be two or more, and may include the following.

Negative electrode active materials may include lithium alloys, carbon materials (such as $LiC_6$ and $LiC_2$), and metallic compounds. Preferable negative electrode active materials include lithium-titanium oxides, oxides of titanium, niobium oxides, silicon oxides, silicon, silicon alloys, iron oxide (for example, $Fe_2O_3$, $Fe_3O_4$, and FeO), manganese oxide (for example, MnO), zinc oxide (for example, ZnO), and metallic sulfides.

Lithium alloys preferably include at least one metal element selected from the group consisting of Si, Al, Zn, Sn, and In. Specific examples include Li—Al, Li—Bi—Cd, and Li—Sn—Cd. As lithium-titanium oxide, for example, $Li_{4+x}Ti_5O_{12}$ ($-1 \leq x \leq 3$) of a spinel structure, $Li_{2+x}Ti_3O_7$ ($0 \leq x \leq 1$) of a ramsdellite structure, $Li_{1+x}Ti_2O_4$ ($0 \leq x \leq 1$), $Li_{1.1+x}Ti_{1.8}O_4$ ($0 \leq x \leq 1$), $Li_{1.07+x}Ti_{1.86}O_4$ ($0 \leq x \leq 1$), $Li_xTiO_2$ ($0 \leq x \leq 1$), $Li_xM1_{1-y}M2_yTi_{6-z}M3_zO_{14+\delta}$ (M1 is at least one element selected from the group consisting of Sr, Ba, Ca, and Mg, M2 is at least one element selected from the group consisting of Cs, K, and Na, M3 is at least one element selected from the group consisting of Al, Fe, Zr, Sn, V, Nb, Ta, and Mo, $2 \leq x \leq 6$, $0 < y < 1$, $0 < z \leq 6$, $-0.5 \leq \delta \leq 0.5$), $Li_{2+w}Na_{2-x}M1_yTi_{6-z}M2_zO_{14+\delta}$ (M1 is at least one element selected from the group consisting of Cs and K, M2 is at least one element selected from the group consisting of Zr, Sn, V, Nb, Ta, Mo, W, Fe, Co, Mn, and Al, $0 \leq w \leq 4$, $0 < x < 2$, $0 \leq y < 2$, $0 < z \leq 6$, and $-0.5 \leq \delta \leq 0.5$), or the like may be used. The volume change upon insertion or extraction for the above kinds of lithium-titanium oxides is small. Examples of oxides of titanium include, for example, $TiO_2$ of an anatase structure and monoclinic $TiO_2$ (B). Examples of niobium oxides include $Nb_2O_5$ and $Nb_2TiO_7$ whose lithium insertion and extraction potential are more noble than 1.0 V (vs. $Li/Li^+$) with respect to the oxidation-reduction potential of metallic lithium. Examples of silicon oxides include SiO and Si—SiO complex. Examples of silicon alloys include Si—Sn and Si—Li. Examples of metallic sulfide include $TiS_2$, FeS, $FeS_2$, NiS, and $MoS_2$.

Also, the negative electrode layer may include a pH adjustor depending on whether the active material is a basic substance or an acidic substance.

As the water borne emulsion binder, in addition to SBR, for example, polyacrylic acid, polyvinyl pyrrolidone, polyvinyl alcohol, or the like may be used. The negative electrode layer may include only one water borne binder or include two or more water borne binders.

Examples of the first binder include polytetrafluoro ethylene (PTFE), polyvinylidene difluoride (PVdF), fluororubber, styrene-butadiene rubber, polyacrylic acid compounds, and imide compounds. These binders may be used alone as the first binder, or two or more binders may be used as the first binder.

Examples of the conductive agent include carbon black (such as furnace black and acetylene black) obtained by the furnace method, the channel method, or the acetylene method, coke, carbon fiber, graphite, metallic compound powder, and metallic powder. These conductive agents may be used alone, or two or more conductive agents may be used.

When the negative electrode layer includes CMC ammonium salt or CMC sodium salt and a water-soluble binder (water borne binder) other than these CMC salts, proportions of the negative electrode active material, CMC salt, water borne binder, and conductive agent included in the negative electrode layer are preferably from 60% by weight to 98.4% by weight for the negative electrode active material, from 0.1% by weight to 10% by weight for the CMC salt, from 0.5% by weight to 10% by weight for the binder such as the water born binder, and from 1% by weight to 20% by weight for the conductive agent.

By setting the amount of the CMC salt included in the negative electrode layer to the range of from 0.1% by weight to 10% by weight, a negative electrode layer that is structurally less susceptible can be obtained. A more desirable range is from 0.5% by weight to 10% by weight.

The amount of the water borne binder included in the negative electrode layer is preferably set to the range of from 0.5% by weight to 10% by weight. Flexibility of the negative electrode layer can thereby be improved. A more desirable range is from 0.5% by weight to 5% by weight.

In the above case, by setting the amount of the conductive agent included in the negative electrode layer to the range of from 1% by weight to 20% by weight, excellent electron conduction paths can be formed, and thus charge-and-discharge can be repeated in a stable manner. A more desirable range is from 3% by weight to 10% by weight.

When the negative electrode layer includes the first binder, proportions of the negative electrode active material, first binder, and conductive agent included in the negative electrode layer are preferably from 70% by weight to 98% by weight for the negative electrode active material, from 1% by weight to 20% by weight for the first binder, and from 1% by weight to 10% by weight for the conductive agent.

If the included amount of the first binder is 1% by weight or more, excellent binding properties between the negative electrode layer and other layers can be exhibited and by extension, more excellent capacity retention after charge-and-discharge cycles can be expected to be exhibited. From the viewpoint of higher capacities, on the other hand, the included amount of the first binder is preferably 20% by weight or less.

In the above case, if the included amount of the conductive agent is 1% by weight or more, the negative electrode layer can exhibit excellent current collecting performance. From the viewpoint of higher capacities, on the other hand, the included amount of the conductive agent is preferably 10% by weight or less.

The negative electrode density is desirably set to 3 g/cm$^3$ or more. This is because, if the negative electrode density is less than 3 g/cm$^3$, a negative electrode having a surface roughness Ra(+) from 0.1 μm to 0.6 μm may not be obtained.

As the surface roughness Ra(+) of the negative electrode layer, the arithmetic average roughness Ra defined by JIS B 0601(1994) or JIS B 0031(1994) is used.

When the negative electrode layer is used as the first electrode layer, maximum height roughness Rz of the negative electrode layer is desirably less than the thickness of the electrolyte layer to prevent a short-circuit between the negative electrode layer (first electrode layer) and the positive electrode layer (second electrode layer). The maximum height roughness Rz of the relevant electrode layer is preferably half the thickness of the electrolyte layer or less.

2) Positive Electrode Layer

In a battery according to the embodiment, at least one of the first electrode layer and the second electrode layer may be a positive electrode layer. The positive electrode layer includes a positive electrode active material (the first active material or the second active material) and a binder. Though different depending on the aspect, the binder includes CMC ammonium salt, CMC sodium salt, or the first binder soluble in an organic solvent. The binder may further include a water borne emulsion binder such as styrene-butadiene rubber (SBR).

The positive electrode layer may further include a conductive agent.

The number of kinds of the positive electrode active material included in the positive electrode layer may be one, or may be two or more and the following is included.

Positive electrode active materials include various oxides, sulfides, and polymers. Examples include, manganese dioxide ($MnO_2$), iron oxide, copper oxide, nickel oxide, lithium-manganese composite oxide (for example, $Li_xMn_2O_4$ or $Li_xMnO_2$), lithium-nickel composite oxide (for example, $Li_xNiO_2$), lithium-cobalt composite oxide ($Li_xCoO_2$), lithium-nickel-cobalt composite oxide (for example, $Li_xNi_{1-y}Co_yO_2$), lithium-manganese-cobalt composite oxide (for example, $LiMn_yCo_{1-y}O_2$), spinel type lithium-manganese-nickel composite oxide ($Li_xMn_{2-y}Ni_yO_4$), lithium-phosphorus composite oxide having an olivine structure ($Li_xFePO_4$, $Li_xFe_{1-y}Mn_yPO_4$, $Li_xVPO_4F$, $Li_xCoPO_4$, and the like), iron sulfate ($Li_xFeSO_4F$, $FeSO_4$, $Fe_2(SO_4)_3$, and the like), and vanadium oxide (for example, $V_2O_5$). Other examples include, conductive polymer materials such as polyaniline and polypyrrole, disulfide polymer materials, sulfur (S), organic materials such as carbon fluoride, and inorganic materials.

As more desirable positive electrode active materials for secondary battery, materials with which a higher battery voltage is obtained can be cited. Examples include lithium-manganese composite oxide ($Li_xMn_2O_4$), lithium-nickel composite oxide ($Li_xNiO_2$), lithium-cobalt composite oxide ($Li_xCoO_2$), lithium-nickel-cobalt composite oxide ($Li_xNi_{1-y}Co_yO_2$), spinel type lithium-manganese-nickel composite oxide ($Li_xMn_{2-y}Ni_yO_4$), lithium-manganese-cobalt composite oxide ($Li_xMn_yCo_{1-y}O_2$), and lithium-iron phosphate ($Li_xFePO_4$). In the above compositional formulas, x and y are desirably in the range of 0 to 1.

Also, the positive electrode active material may include lithium-nickel-cobalt-manganese composite oxide whose composition is represented by $Li_aNi_bCo_cMn_dO_2$ ($0 \le a \le 1.1$, $b+c+d=1$). In the lithium-nickel-cobalt-manganese composite oxide, higher capacities can be obtained when $0 \le a \le 1.1$, $0.3 \le b \le 0.9$, $0.1 \le c \le 0.5$, $0.1 \le d \le 0.5$, which is preferable.

As will be described below, a nonaqueous electrolyte including an ordinary-temperature-molten salt may be used for the electrolyte layer and in that case, using lithium-iron phosphate, $Li_xVPO_4F$, lithium-manganese composite oxide, lithium-nickel composite oxide, or lithium-nickel-cobalt composite oxide is desirable from the viewpoint of cycle life. This is because reactivity between the positive electrode active material and ordinary-temperature-molten salt becomes less.

As the water borne emulsion binder, in addition to SBR, for example, polyacrylic acid, polyvinyl pyrrolidone, or polyvinyl alcohol may be used. The positive electrode layer may include only one water borne binder, or include two or more water borne binders.

Examples of the first binder include polytetrafluoroethylene (PTFE), polyvinylidene difluoride (PVdF), fluororubber, acrylic rubber, and acrylic resin. These binders may be used alone as the first binder, or two or more binders may be used as the first binder.

Examples of the conductive agent include carbon black obtained by the furnace method, the channel method, or the acetylene method, coke, carbon fiber, graphite, metallic compound powder, and metallic powder. These conductive agents may be used alone, or two or more conductive agents may be used.

When the positive electrode layer includes CMC ammonium salt or CMC sodium salt and a water-soluble binder (water borne binder) other than these CMC salts, proportions of the positive electrode active material, CMC salt, water borne binder, and conductive agent included in the positive electrode layer are preferably from 60% by weight to 98.6% by weight for the positive electrode active material, from 0.1% by weight to 10% by weight for the CMC salt, from 0.3% by weight to 10% by weight for the binder such as the water born binder, and from 1% by weight to 20% by weight for the conductive agent.

By setting the amount of the CMC salt included in the positive electrode layer to the range of from 0.1% by weight to 10% by weight, a positive electrode layer that is structurally less susceptible can be obtained. A more desirable range is from 0.5% by weight to 10% by weight.

The amount of the water borne binder included in the positive electrode layer is preferably set to the range of from 0.3% by weight to 10% by weight. Flexibility of the positive electrode layer can thereby be improved. A more desirable range is from 0.5% by weight to 5% by weight.

In the above case, by setting the amount of the conductive agent included in the positive electrode layer to the range of from 1% by weight to 20% by weight, excellent electron conduction paths can be formed, and thus charge-and-discharge can be repeated in a stable manner. A more desirable range is from 3% by weight to 10% by weight.

When the positive electrode layer includes the first binder, proportions of the positive electrode active material, first binder, and conductive agent included in the positive electrode layer are preferably from 80% by weight to 95% by weight for the positive electrode active material, from 2% by weight to 17% by weight for the first binder, and from 3% by weight to 18% by weight for the conductive agent.

If the included amount of the first binder is 2% by weight or more, excellent binding properties between the positive electrode layer and other layers can be exhibited and by extension, more excellent capacity retention after charge-and-discharge cycles can be expected to be exhibited. From the viewpoint of higher capacities, on the other hand, the included amount of the first binder is preferably 17% by weight or less.

If the included amount of the conductive agent is 3% by weight or more in the above case, the positive electrode layer can exhibit excellent current collecting performance. From the viewpoint of higher capacities, on the other hand, the included amount of the conductive agent is preferably 18% by weight or less.

The positive electrode density is desirably set to 3 g/cm$^3$ or more. This is because, if the positive electrode density is less than 3 g/cm$^3$, a positive electrode having a surface roughness Ra(+) from 0.1 μm to 0.6 μm may not be obtained.

Like the case of the negative electrode layer, as the surface roughness Ra(+) of the positive electrode layer, the arithmetic average roughness Ra defined by JIS B 0601 (1994) or JIS B 0031(1994) is used.

When the positive electrode layer is used as the first electrode layer, the maximum height roughness Rz of the positive electrode layer is desirably less than the thickness of the electrolyte layer to prevent a short-circuit between the positive electrode layer (first electrode layer) and the negative electrode layer (second electrode layer). The maximum height roughness Rz of the relevant electrode layer is preferably half the thickness of the electrolyte layer or less.

3) Electrolyte Layer

The electrolyte layer includes an electrolyte. The electrolyte layer also includes a salt of carboxymethylcellulose (CMC) as a binder, but the type of CMC salt is different depending on the aspect. When, as described above, the first electrode layer includes CMC ammonium salt, the electrolyte layer includes CMC sodium salt. When the second electrode layer includes CMC sodium salt, the electrolyte layer includes CMC ammonium salt. The electrolyte layer can further include a water borne emulsion binder such as styrene-butadiene rubber (SBR).

As the electrolyte, for example, a solid electrolyte such as inorganic solid particles having ionic conductivity toward Li can be used. The electrolyte included in the electrolyte layer may be one kind or two kinds or more. As inorganic solid particles having ionic conductivity toward Li, it is preferable to use inorganic solid particles of a garnet structure due to advantages of high ionic conductivity toward Li, high reduction resistance, and a wide electrochemical window. As inorganic solid particles in a garnet structure, examples include, $La_{5+x}A_xLa_{3-x}M_2O_{12}$ (A is at least one selected from the group consisting of Ca, Sr, and Ba and M is at least one selected from the group consisting of Nb and Ta) and $Li_3M_{2-x}L_2O_{12}$ (M is at least one selected from the group consisting of Ta and Nb, and L is Zr), $Li_{7-3x}Al_xLa_3Zr_3O_{12}$, and $Li_7La_3Zr_2O_{12}$. Among others, $Li_{6.25}Al_{0.25}La_3Zr_3O_{12}$ and $Li_7La_3Zr_2O_{12}$ have advantages of excellent discharge performance and cycle life performance due to high ionic conductivity of Li and electrochemical stability and further, when used as a liquid nonaqueous electrolyte, as will be described below, have the advantage of being chemically stable with respect to organic solvents even as fine particles. x is preferably in the range of from 0 to 0.5.

As other examples of the solid electrolyte, included are titanium oxide, titanium hydroxide, barium titanate, alumina, iron oxide, silicon oxide, aluminum hydroxide, gibbsite, boehmite, bayerite, magnesium oxide, silica, zirconium oxide, magnesium hydroxide, silica, barium titanate, lithium tetraborate, lithium tantalate, mica, silicon nitride, aluminum nitride, and zeolite.

The solid electrolyte includes, for example, a polymeric solid electrolyte prepared by dissolving an electrolyte into polymeric materials and then solidifying or an inorganic solid electrolyte that is a solid material having ionic conductivity towards Li.

Using the solid electrolyte as described above, a liquid nonaqueous electrolyte need not be used for the battery. To further improve ionic conductivity, there may be used a liquid nonaqueous electrolyte including an electrolyte and an organic solvent or a gel nonaqueous electrolyte in which a liquid nonaqueous electrolyte and a polymeric material are made composite. For example, the electrolyte layer may be impregnated with the liquid nonaqueous electrolyte and/or the gel nonaqueous electrolyte.

The liquid nonaqueous electrolyte is preferably a solution obtained by dissolving an electrolyte in an organic solvent at a concentration of from 0.5 mol/L to 2.5 mol/L.

Examples of the electrolyte include lithium salts such as lithium perchlorate ($LiClO_4$), lithium hexafluorophosphate ($LiPF_6$), lithium tetrafluoroborate ($LiBF_4$), lithium hexafluoroarsenate ($LiAsF_6$), lithium trifluoromethanesulfonate ($LiCF_3SO_3$), and lithium bistrifluoromethylsulfonylimide ($LiN(CF_3SO_2)_2$) and mixtures of the above lithium salts. The electrolyte is preferably one that is difficult to oxidize even at a high potential, and $LiPF_6$ is particularly preferable.

Examples of the organic solvent include cyclic carbonate such as propylene carbonate (PC), ethylene carbonate (EC), and vinylene carbonate; linear carbonate such as diethyl carbonate (DEC), dimethyl carbonate (DMC), and methylethyl carbonate (MEC); cyclic ether such as tetrahydrofuran (THF), 2-methyl tetrahydrofuran (2MeTHF), and dioxolane (DOX); linear ether such as dimethoxy ethane (DME) and diethoxy ethane (DEE); γ-butyrolactone (GBL), acetonitrile (AN), and sulfolane (SL). These organic solvents can be used alone or as a mixed solvent.

Examples of the polymeric material include polyvinylidene difluoride (PVdF), polyacrylonitrile (PAN), and polyethylene oxide (PEO).

Alternatively, ordinary-temperature-molten salt including Li ions (ionic melt) may also be used as the nonaqueous electrolyte.

The ordinary-temperature-molten salt (ionic melt) refers to, among organic salts formed by combining organic cations and anions, compounds that can exist as a liquid at ordinary temperature (15 to 25° C.). The ordinary-temperature-molten salt includes ordinary-temperature-molten salt that exists as a liquid alone, ordinary-temperature-molten salt that becomes liquid by being mixed with an electrolyte, and ordinary-temperature-molten salt that becomes liquid by being dissolved in an organic solvent. In general, the melting point of ordinary-temperature-molten salt used for a nonaqueous electrolyte is 25° C. or less. The organic cation generally has a quaternary ammonium framework.

The amount of CMC salt (CMC ammonium salt or CMC sodium salt) included in the electrolyte layer is preferably set to the range of from 0.1% by weight to 30% by weight with respect to the weight of the electrolyte layer. A more desirable range is from 0.5% by weight to 10% by weight.

As the water borne emulsion binder, in addition to SBR, for example, polyacrylic acid, polyvinyl pyrrolidone, or polyvinyl alcohol can be used. The electrolyte layer may include only one water borne binder or two or more water borne binders. The amount of these water borne binders included in the electrolyte layer is preferably set to the range of from 0.1% by weight to 10% by weight with respect to the weight of the electrolyte layer. If the included amount of these water borne binders is within the range, flexibility of the electrolyte layer can be improved. A more desirable range is from 0.5% by weight to 5% by weight.

4) Current Collecting Layer

The current collecting layer may include foil (current collecting foil) as a current collector, or a conductive agent and a second binder.

As the current collecting foil, for example, aluminum foil, copper foil, stainless steel foil, or foil of respective alloys can be used. The current collecting foil can be made a current collector for lead connection by being disposed so as to be in contact with either the first electrode layer or the second electrode layer positioned in the outermost layer of, for example, an electrode stack unit including the first electrode layer, the electrolyte layer, and the second electrode layer or an electrode group in which plural electrode stack units are stacked.

When a current collecting layer is formed by applying conductive paste including a conductive agent and a second binder onto an electrode stack and drying the conductive paste, a publicly known conductive agent can be used as the conductive agent and a publicly known binder can be used as the second binder. Examples of the conductive paste include silver paste, carbon paste, copper paste, gold paste, aluminum paste, tin paste, and mixed paste of the above pastes. Even if a current collecting layer is formed by using conductive paste, the current collecting layer formed by applying the paste onto the outermost layer of the electrode stack can also be used as a current collector for lead connection.

5) Container Member

As the container member, for example, a container made of metal that is 0.5 mm or less in wall thickness or a container made of laminate film of 0.2 mm or less in wall thickness can be used. As the container made of metal, for example, a metal can made of aluminum, aluminum alloy, iron, stainless steel or the like having an angular or cylindrical shape can be used. The wall thickness of the container made of metal is more desirably made 0.2 mm or less.

An alloy including elements such as magnesium, zinc, or silicon is desirable as the aluminum alloy composing the container made of metal. On the other hand, the amount of included transition metals such as iron, copper, nickel, and chromium is desirably set to 1% or less. Accordingly, long-term reliability and heat dissipation properties in a high-temperature environment can remarkably be improved.

Also, a metal can made of aluminum or aluminum alloy desirably has an average crystal grain size of 50 μm or less. More desirably, the average crystal grain size is 30 μm or less. Still more desirably, the average crystal grain size is 5 μm or less. By setting the average crystal grain size to 50 μm or less, the strength of the metal can made of aluminum or aluminum alloy is able to be remarkably increased so that the wall thickness of the can is able to be made still thinner. As a result, there can be realized a battery suitable for vehicle installation that is light, of high power, and excellent in long-term reliability.

A multilayer film in which, for example, metal foil is coated with a resin film can be used as the laminate film. As the resin, a polymeric resin such as polypropylene (PP), polyethylene (PE), nylon, and polyethylene terephthalate (PET) can be used.

6) Electrode Terminal

The electrode terminal (electrode lead) is preferably formed from a material that is electrically stable and conductive in the potential range of from 0.4 V to 3 V (vs.Li/Li$^+$) with respect to the ionization potential of lithium. More specifically, examples include aluminum and aluminum alloys including elements such as Mg, Ti, Zn, Mn, Fe, Cu, Si and the like. It is desirable to use the same material as that of the current collector for lead connection, in order to reduce the contact resistance.

An exemplary electrode group according to the first embodiment will be described using FIG. 1. Here, an example in which the first electrode layer is a negative electrode layer and the second electrode layer is a positive electrode layer will be described, but the embodiment is not limited to this aspect and, for example, a form in which the first electrode layer is a positive electrode layer and the second electrode layer is a negative electrode is also included.

An electrode group 6 shown in FIG. 1 includes electrode stacks 2A to 2D and current collectors 3a, 3b for lead connection. In each of the electrode stacks 2A to 2D, a current collecting layer 3, a negative electrode layer 4, an electrolyte layer 7, and a positive electrode layer 5 are stacked in this order. The current collecting layer 3 of the electrode stack 2A also serves as the current collector 3a for lead connection. The electrode stacks 2A to 2D are stacked in such a way that the current collecting layer 3 is positioned between the positive electrode layer 5 of one electrode stack and the negative electrode layer 4 of another electrode stack. In FIG. 1, the current collector 3b for lead connection is arranged on the positive electrode layer 5 of the electrode stack 2D positioned in the top portion.

In FIG. 1, the width of the current collectors 3a, 3b for lead connection is depicted longer than the width of the other current collecting layers 3, the negative electrode layers 4, the positive electrode layers 5, and the electrolyte layers 7, but the width of these current collectors 3a, 3b for lead connection and the width of the other current collecting layers 3, the negative electrode layers 4, the positive electrode layers 5, and the electrolyte layers 7 may be equal. Also, depending on the form of the electrode group, as described above, the current collector 3b for lead connection at the top may be omitted.

Also in FIG. 1, four electrode stacks of the electrode stacks 2A to 2D are depicted, but the number of electrode stacks included in the electrode group is not limited to four and may be one to three or five or more.

FIG. 2 is a schematic diagram showing an example of a battery according to the first embodiment.

As shown in FIG. 2, a battery 30 includes a container member 31, a wound electrode group 6 in a flat shape, a negative electrode terminal 36, and a positive electrode terminal 37. The container member 31 is, for example, a can made of metal or a bag-shaped container made of a laminate film including two resin layers and a metal layer interposed therebetween. The wound electrode group 6 in a flat shape is housed inside the container member 31 and is obtained by winding, for example, the electrode group 6 of the stack type shown in FIG. 1. Alternatively, a single unit of the electrode stack that is wound may also be used as the wound electrode group 6. The negative electrode terminal 36 is connected to the current collector 3a for lead connection shown in FIG. 1 and the positive electrode terminal 37 is connected to the current collector 3b for lead connection. Though not depicted, distal ends of the negative electrode terminal 36 and the positive electrode terminal 37 that are not connected to the current collector 3a and the current collector 3b for lead connection are drawn out of the container member 31. The battery 30 may also include a nonaqueous electrolyte (not shown) housed in the container member 31.

FIG. 3 is a partially cut-out perspective view schematically showing another exemplary battery according to the first embodiment. A battery 40 depicted in FIG. 3 has a structure in which flat electrode groups are stacked. The battery 40 includes a container member 41, a wound electrode group 6, a negative electrode terminal 46, and a positive electrode terminal 47. The container member 41 is made of, for example, a laminate film including two resin layers and a metal layer interposed therebetween. The electrode group 6 is, for example, the electrode group 6 of the stack type shown in FIG. 1. The negative electrode terminal 46 is connected to the current collector 3a for lead connection shown in FIG. 1 and the positive electrode terminal 47 is connected to the current collector 3b for lead connection. As shown in FIG. 3, the negative electrode terminal 46 and the positive electrode terminal 47 are drawn out to the outside of the container member 41 in mutually opposite directions. Alternatively, the negative electrode terminal 46 and the positive electrode terminal 47 may be drawn out from the same side of the container member 41. The battery 40 may also include a nonaqueous electrolyte (not shown) housed in the container member 41.

Still another exemplary battery according to an embodiment will be described using FIGS. 4 to 6.

FIG. 4 is a schematic diagram showing an exemplary zigzag type electrode group that may be included in the battery according to the embodiment. FIG. 5 is a schematic sectional view of a battery including the zigzag type electrode group shown in FIG. 4. FIG. 6 is an enlarged sectional view of portion A in FIG. 5.

A zigzag type electrode group 11 shown in FIG. 4 is an electrode group obtained by, for example, folding in zigzag the electrode group 6 of the stack type shown in FIG. 1. Alternatively, the zigzag type electrode group 11 may be an electrode group obtained by folding in zigzag a single unit of the electrode stack. In the zigzag type electrode group 11, as shown in FIG. 4, a singular plate body (for example, the electrode group 6) is divided into plural sections of a predetermined length in one direction and each section portion 8 is successively folded alternately and stacked in zigzag. By folding in zigzag the electrode group in this manner, the energy density can be improved.

A battery 50 shown in FIG. 5 has a container member 51 in an approximate box shape and the zigzag type electrode group 11 housed in the container member 51. Here, the zigzag type electrode group 11 may be the zigzag type electrode group 11 shown in FIG. 4. The container member 51 is made of, for example, a laminate film including two resin layers and a metal layer interposed therebetween. For example, an insulating member 52 such as of a nonwoven cloth or a resin material is disposed on the inner peripheral surface of the container member 51. Incidentally, for example, when pressure is applied to the zigzag type electrode group 11 from above and below along the direction perpendicular to the section portions 8 to improve adhesion properties between the section portions 8, the insulating member 52 may be omitted if insulating tape is used as the electrode pressing member.

A positive electrode terminal 57 is connected to the current collector 3b for lead connection and a negative electrode terminal 56 is connected to the current collector 3a for lead connection near the outer periphery of the zigzag type electrode group 11. The negative electrode terminal 56 and the positive electrode terminal 57 extend to the outside from an opening (not shown) of the container member 51. The zigzag type electrode group 11 is completely sealed in by heat-sealing the opening of the container member 51 across the negative electrode terminal 56 and the positive electrode terminal 57. The battery 50 may also include a nonaqueous electrolyte (not shown) housed in the container member 51.

Figure 6:
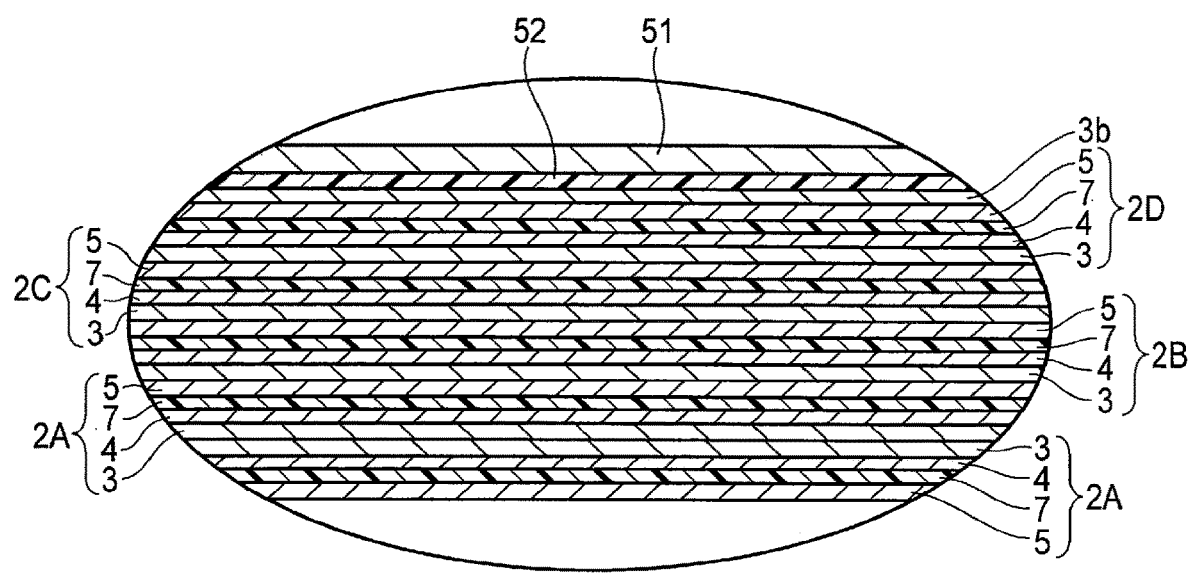
FIG. 6 is an enlarged sectional view of portion A in FIG. 5.

As shown in FIG. 6, the stacked electrode stacks 2A to 2D are included within each section portion 8 of the zigzag type electrode group 11. As shown in a lower portion of FIG. 6, two layers of the current collecting layer 3 may successively be stacked at a contact surface of one section portion 8 and the section portion 8 adjacent thereto. Further, as can be seen, the order of the current collecting layer 3, the negative electrode layer 4, the electrolyte layer 7, and the positive electrode layer 5 in the electrode stack 2A shown in the bottom portion of FIG. 6 is of a reversed order in comparison to each of the layers in the other electrode stacks 2A to 2D. Thus, the order of each layer in the electrode stacks 2A to 2D is reversed between the section portions 8 that are adjacent to each other in the zigzag type electrode group 11.

Also in FIG. 6, four electrode stacks of the electrode stacks 2A to 2D are depicted as electrode stacks included in the section portion 8, but the number of electrode stacks included in the section portion 8 is not limited to four and may be one to three or five or more.

<Manufacturing Method>

Next, an example of a production method of an electrode stack will be described.

A production method for one aspect of the electrode stack according to the embodiment includes forming a first electrode layer by applying a first electrode material slurry including a first active material and carboxymethylcellulose ammonium salt (CMC ammonium salt) onto a current collector layer and drying the first electrode material slurry, forming an electrolyte layer by applying an electrolyte material slurry including an electrolyte and carboxymethylcellulose sodium salt (CMC sodium salt) onto the first electrode layer and drying the electrolyte material slurry, and forming a second electrode layer by applying a second electrode material slurry including a second active material and a first binder soluble in an organic solvent onto the electrolyte layer and drying the second electrode material slurry.

First, a first electrode material slurry including a first active material and CMC ammonium salt is prepared. The first electrode material slurry may further include a water-soluble binder (water borne emulsion binder such as styrene-butadiene rubber (SBR)) other than carboxymethylcellulose (CMC) and a conductive agent. When a negative electrode is formed as the first electrode layer, the above described negative electrode active material is used as the first active material and a conductive agent that may be used for the negative electrode layer is used as the conductive agent. When a positive electrode is formed as the first electrode layer, the above described positive electrode active material is used as the first active material and a conductive agent that may be used for the positive electrode layer is used as the conductive agent.

When preparing a slurry, for example, all materials may be mixed at once; however, the distribution of CMC salt in the electrode layer can be made uniform by first dissolving carboxymethylcellulose salt as a binder in water and then, adding and mixing in other materials one after another, which is preferable. A carbon based material or the like as a conductive agent is hydrophobic and becomes aggregated when directly put into pure water, in which case, these materials may not be dispersed in a satisfactory manner. By dissolving CMC salt in water prior to the input of such a hydrophobic material, dispersibility can be secured. This can be considered to be caused by adhering of CMC salt, which are polar molecules, to the surface of the hydrophobic material, preventing aggregation. Water-soluble binders (water borne binders) other than CMC salt are particularly preferably added last, after other materials are added to the mixed solution. A solvent including water may be used as a solvent of the slurry and, for example, pure water or an aqueous solution may be used.

It is preferable to set the mixing ratio of the first active material, CMC salt, other water-soluble binders (water borne binders), and the conductive agent included in the first electrode material slurry as described below.

When a negative electrode layer is formed as the first electrode layer, the amount of the first active material (negative electrode active material) included in the slurry is preferably from 60% by weight to 98.4% by weight. The included amount of the CMC salt is preferably from 0.1% by weight to 10% by weight. The included amount of the conductive agent is preferably from 1% by weight to 20% by weight. The included amount of water borne binders is preferably from 0.5% by weight to 10% by weight.

When a positive electrode layer is formed as the first electrode layer, the amount of the first active material (positive electrode active material) included in the slurry is preferably from 60% by weight to 98.6% by weight. The included amount of the CMC salt is preferably from 0.1% by weight to 10% by weight. The included amount of the conductive agent is preferably from 1% by weight to 20% by weight. The included amount of water borne binders is preferably from 0.3% by weight to 10% by weight.

If the included amount of the CMC salt is 0.1% by weight or more, the viscosity of slurry can be increased and a dispersed state can easily be maintained by increasing dispersibility of other materials so that excellent battery performance can be exhibited. If the viscosity of slurry is too high, on the other hand, handling becomes more difficult and thus, the included amount of the CMC salt is preferably 10% by weight or less.

If the included amount of the conductive agent is 1% by weight or more, the first electrode layer can exhibit excellent current collecting performance. From the viewpoint of higher capacities, on the other hand, the included amount of the conductive agent is preferably 20% by weight or less.

If the included amount of water borne binders is 0.5% by weight or more when a negative electrode layer is formed, and is 0.3% by weight or more when a positive electrode layer is formed, excellent binding properties between the first electrode layer and the current collector can be exhibited so that excellent life performance of the battery can be expected. From the viewpoint of higher capacities, on the other hand, the included amount of the water borne binders is preferably 10% by weight or less.

The prepared first electrode material slurry is applied to, for example, one surface of the current collector as a current collecting layer. The die-head method, knife method (comma method), gravure method, micro-gravure method, screen printing method or the like may be used as a method of applying the first electrode material slurry.

Next, the first electrode layer is formed by drying the coat of the applied slurry. Here, it is desirable to completely dry the coat. After being dried completely, the CMC ammonium salt does not re-dissolve in water. Thus, when the first electrode layer is formed, by drying the coat completely, the structure of the first electrode layer is made less susceptible even if a slurry including water is applied thereon.

A specific example of the method of forming a first electrode layer will be described. In this example, used is a roll-to-roll process in which a current collector is transferred from a supply roller to a winding roller and during which, a slurry is applied by the die-head method onto the current collector supplied from the supply roller and after the applied coat is dried, the current collector having the coat formed thereon is wound by the winding roller. The current collector is transferred by the roll-to-roll process, and a slurry discharged from the die head is applied onto the current collector while adjusting the thickness of the applied coat to be a desired thickness. Here, the thickness can be adjusted by the transfer speed of the current collector and the discharge amount from the die head. The slurry applied onto the current collector subsequently enters a drying oven set up on the transfer path and dried. The temperature is raised initially from a few dozen degrees (° C.) to a temperature exceeding 100° C. in the end for drying. The total time during which the slurry is in the furnace is preferably from 1 s to 10 min.

The coat of the applied first electrode material slurry can be examined to confirm complete drying as described below. The current collector having the dried first electrode layer formed thereon is stored in a thermostat set to the temperature of from 100° C. to 130° C. for a period of from 30 min to 120 min. Upon which, a weight change before storage and after storage is checked and if the weight change with respect to the weight before storage is 0.1% or less, the formed coat can be determined to be completely dried. Instead of storing in a thermostat, the current collector having the first electrode layer formed thereon may be placed on a hot plate that is set to a temperature of from 100° C. to 130° C.

Next, an electrolyte layer is formed on the first electrode layer formed as described above. More specifically, an electrolyte layer is formed by applying an electrolyte material slurry including an electrolyte and CMC sodium salt and drying the applied coat. The electrolyte material slurry may include a water-soluble binder (water borne emulsion binder such as SBR) other than carboxymethylcellulose (CMC) salt.

When preparing the electrolyte material slurry, like the first electrode material slurry, for example, all materials may be mixed at once; however, it is preferable to first dissolve CMC salt in water and then, add and mix in other materials one after another. Water borne binders are particularly preferably added last, after other materials are added to the mixed solution. A solvent including water may be used as a solvent of the slurry and, for example, pure water or an aqueous solution may be used.

The amount of CMC salt included in the electrolyte material slurry is preferably from 0.1% by weight to 30% by weight with respect to materials included in the slurry (excluding the solvent). The included amount of other water borne binders is preferably from 0.1% by weight to 10% by weight.

If the included amount of the CMC salt is 0.1% by weight or more, the viscosity of the slurry can be increased and a dispersed state can easily be maintained by increasing dispersibility of other materials so that excellent battery performance can be exhibited. If the viscosity of the slurry is too high, on the other hand, handling becomes more difficult and thus, the included amount of the CMC salt is preferably 30% by weight or less. A more desirable range is from 0.5% by weight to 10% by weight.

If the included amount of water borne binders is 0.1% by weight or more, excellent binding properties between the electrolyte layer and the first electrode layer can be exhibited so that excellent life performance of battery can be expected. By setting the included amount of water borne binders to 10% by weight or less, on the other hand, flexibility of the electrolyte layer can be improved. A more desirable range is from 0.5% by weight to 10% by weight.

As described above, the CMC ammonium salt as a binder of the first electrode layer is not dissolved in water after complete drying. Thus, even if the solvent of the electrolyte material slurry applied thereon includes water, the first electrode layer is not affected. A water borne binder such as SBR, which may be included together with CMC ammonium salt in the first electrode layer, does re-dissolve in water, but the CMC ammonium salt maintains the framework of the first electrode layer and so the first electrode layer is hardly affected structurally.

On the other hand, the CMC ammonium salt swells due to impregnation with an organic solvent such as N-methyl pyrrolidone (NMP). Thus, if an organic solvent is used as a solvent of the slurry applied onto the first electrode layer including CMC ammonium salt, the structure of the first electrode layer may significantly be affected, which is not preferable.

The die-head method, knife method (comma method), gravure method, micro-gravure method, screen printing method or the like can be used, like for the first electrode material slurry, as a method of applying the electrolyte material slurry onto the first electrode layer.

The electrolyte layer can be formed on the first electrode layer, for example, in a manner similar to forming the first electrode layer on the current collector. As a specific example, the current collector having the first electrode layer formed thereon, which can be produced in the above specific example, is transferred by the roll-to-roll process and the electrolyte material slurry discharged from the die head is applied onto the first electrode layer while making adjustments so that the thickness of the applied coat becomes a desired thickness. Like for the first electrode material slurry, the thickness can be adjusted by the transfer speed of the current collector and the discharge amount from the die head. The slurry applied onto the first electrode layer on the current collector subsequently enters a drying oven set up on the transfer path and dried. The temperature is raised initially from a few dozen degrees (° C.) to a temperature exceeding 100° C. in the end for drying. The total time during which the slurry is in the furnace is preferably from 1 s to 10 min.

Subsequently, a second electrode layer is formed on the formed electrolyte layer. More specifically, a second electrode layer is formed by applying a second electrode material slurry including a second active material and a first binder soluble in an organic solvent and drying the applied coat.

As the solvent of the second electrode material slurry, a solvent that can dissolve the first binder is used. For example, an organic solvent such as N-methyl pyrrolidone (NMP) that is suitable for dissolving the first binder that may be used for the negative electrode layer and the positive electrode layer described above may be selected and used. When a negative electrode is formed as the first electrode layer, a positive electrode layer as the second electrode layer can be formed by using the above described positive electrode active material as the second active material and using a conductive agent that may be used for the positive electrode layer as the conductive agent. When a positive electrode is formed as the first electrode layer, a negative electrode layer as the second electrode layer can be formed by using the above described negative electrode active material as the second active material and using a conductive agent that may be used for the negative electrode layer as the conductive agent.

On the other hand, the second electrode material slurry desirably does not include the salt of carboxymethylcellulose, neither CMC ammonium salt nor CMC sodium salt. As described above, CMC ammonium salt is swelled by an organic solvent and thus, if CMC ammonium salt is included in the second electrode material slurry, fluidity or uniformity of the slurry may be degraded, which is not desirable. The CMC sodium salt is not dissolved in an organic solvent and could decrease the energy density of the formed second electrode layer. Thus, CMC sodium salt is desirably not included in the second electrode material slurry.

It is preferable to set the mixing ratio of the second active material, the conductive agent, and the first binder included in the second electrode material slurry as described below.

When a positive electrode layer is formed as the second electrode layer, the amount of the second active material (positive electrode active material) included in the slurry is preferably from 80% by weight to 95% by weight. The included amount of the conductive agent is preferably from 3% by weight to 16% by weight. The included amount of the first binder is preferably from 2% by weight to 17% by weight.

When a negative electrode layer is formed as the second electrode layer, the amount of the second active material (negative electrode active material) included in the slurry is preferably from 70% by weight to 98% by weight. The included amount of the conductive agent is preferably from 1% by weight to 10% by weight. The included amount of the first binder is preferably from 1% by weight to 20% by weight.

If the included amount of the conductive agent is within the above range, the second electrode layer can exhibit excellent current collecting performance and high capacities.

If the included amount of the first binder is within the above range, excellent binding properties between the second electrode layer and the electrolyte layer can be exhibited so that excellent life performance of battery can be expected, and high capacities can be exhibited.

CMC sodium salt as a binder of the electrolyte layer is not dissolved in an organic solvent. Thus, even if the second electrode material slurry applied onto the electrolyte layer including CMC sodium salt as a binder includes an organic solvent, the electrolyte layer is not affected. On the other hand, CMC sodium salt does re-dissolve in water even after drying and thus, if the solvent of slurry applied onto the electrolyte layer including CMC sodium salt includes water, the electrolyte layer and the second electrode layer are mutually dissolved, which is not desirable.

The die-head method, knife method (comma method), gravure method, micro-gravure method, screen printing method or the like can be used, like for the first electrode material slurry and the electrolyte material slurry, as a method of applying the second electrode material slurry onto the electrolyte layer.

The second electrode layer can be formed, for example, in a manner similar to the first electrode layer and the electrolyte layer, using the roll-to-roll process. As a specific example, the current collector having the first electrode layer and the electrolyte layer formed thereon in this order, which can be produced by the above specific example, is transferred by the roll-to-roll process and the electrolyte material slurry discharged from the die head is applied onto the electrolyte layer while making adjustments so that the thickness of the coated film becomes a desired thickness. Like for the first electrode material slurry and the electrolyte material slurry, the thickness can be adjusted by the transfer speed of the current collector and the discharge amount from the die head. The slurry applied onto the electrolyte layer subsequently enters a drying oven set up on the transfer path for drying. The appropriate setting temperature of the drying oven depends on the organic solvent used for slurry and when, for example, NMP is used, the temperature is raised initially from a few dozen degrees (° C.) to a temperature exceeding 130° C. in the end for drying. The total time during which the slurry is in the furnace is preferably from 1 s to 10 min.

Using the above production method, there can be formed on the current collector, a unit of the electrode stack configured with the first electrode layer including the first electrode active material and CMC ammonium salt, the electrolyte layer including an electrolyte and CMC sodium salt, and the second electrode layer including the second electrode active material and the first binder soluble in an organic solvent integrated in this order.

In the above example, the electrode stack according to one aspect of the embodiment is produced by forming in the following order, each of the first electrode layer including CMC ammonium salt as a binder, the electrolyte layer including CMC sodium salt as a binder, and the second electrode layer including the first binder soluble in an organic solvent as a binder. An electrode stack according to the other aspect of the embodiment can be produced, for example, as described below. More specifically, an integrated unit of electrode stack can be produced by forming in the following order, each of the first electrode layer including the first binder soluble in an organic solvent, the electrolyte layer including CMC ammonium salt as a binder, and the second electrode layer including CMC sodium salt as a binder.

That is, a production method for the other aspect of an electrode stack according to the embodiment includes forming a first electrode layer by applying a first electrode material slurry including a first active material and a first binder soluble in an organic solvent onto a current collector layer and drying the first electrode material slurry, forming an electrolyte layer by applying an electrolyte material slurry including an electrolyte and carboxymethylcellulose ammonium salt (CMC ammonium salt) onto the first electrode layer and drying the electrolyte material slurry, and forming a second electrode layer by applying a second electrode material slurry including a second active material and carboxymethylcellulose sodium salt (CMC sodium salt) onto the electrolyte layer and drying the second electrode material slurry.

First, a first electrode layer including a first active material and a first binder soluble in an organic solvent is produced. Here, as the first electrode material slurry in this aspect, the same slurry as the second electrode material slurry in the aspect described above may be used. Excluding the change of the slurry, the first electrode layer can be formed by following the procedure similar to that in the aspect described above.

Next, an electrolyte layer including an electrolyte and CMC ammonium salt is formed on the first electrode layer. Here, as the electrolyte material slurry in this aspect, used is a slurry similar to the electrolyte material slurry in the aspect described above, but including CMC ammonium salt instead of CMC sodium salt. Excluding the change of the slurry, the electrolyte layer can be formed by following the procedure similar to that in the aspect described above. Here, it is preferable to completely dry the applied coat of slurry including CMC ammonium salt. Complete drying of the applied coat can be examined by the method described above.

Next, a second electrode layer including the second active material and CMC sodium salt is formed on the electrolyte layer. Here, as the second electrode material slurry in this aspect, used is a slurry similar to the first electrode material slurry in the aspect described above, but including CMC sodium salt instead of CMC ammonium salt. Excluding the change of the slurry, the second electrode layer can be formed by following the procedure similar to that in the aspect described above. Like in the aspect described above, even if a slurry including water is applied onto a layer obtained by completely drying the applied coat including CMC ammonium salt, the layer is not affected structurally.

Using the above production method, there can be formed on the current collector, a unit of the electrode stack configured with the first electrode layer including the first electrode active material and the first binder soluble in an organic solvent, the electrolyte layer including an electrolyte and CMC ammonium salt, and the second electrode layer including the second electrode active material and CMC sodium salt integrated in this order.

In either of the aspects, the electrolyte layer is formed by applying a slurry of materials of the electrolyte layer onto the first electrode layer and drying the slurry. Thus, the electrolyte layer and the first electrode layer are closely in contact to a high degree. The surface of the first electrode material layer obtained by drying the first electrode material slurry may not be completely flat, and may have fine pores and steps formed thereon. When forming the electrolyte layer thereon, the electrolyte material slurry fills in pores and the like and fits to the shape, such as steps, on the surface of the first electrode layer, and thus, the first electrode layer and the electrolyte layer are bound in close contact.

Similarly, the second electrode layer is formed by applying a slurry of materials of the second electrode layer onto the electrolyte layer and drying the slurry. Thus, the second electrode layer and the electrolyte layer are closely in contact to a high degree. The surface of the electrolyte layer obtained by drying the electrolyte material slurry may not be completely flat, and may have fine pores and steps formed thereon. When forming the second electrode layer thereon, the second electrode material slurry fills in pores and the like and fits to the shape, such as steps, on the surface of the electrolyte layer, and thus, the second electrode layer and the electrolyte layer are bound in close contact.

By thus applying the respective materials slurry and drying when forming the electrolyte layer on the first electrode layer and forming the second electrode layer on the electrolyte layer to produce an electrode stack, each of the layers is bound together in such a manner that the surface shape of the layers mutually conform to one another. In an electrode stack in which each of the layers is integrated together as described above, adhesion properties between layers are higher than a case in which an electrode is produced by stacking and pressing separately produced layers and thus, excellent ionic conductivity can be obtained.

In addition, there is no need to flip the current collector between the formation of the first electrode layer, the formation of the electrolyte layer, and the formation of the second electrode layer and thus, a continuous single-side application method can be implemented. For example, a roll-to-roll process to form the first electrode layer, a roll-to-roll process to form the electrolyte layer, and a roll-to-roll process to form the second electrode layer can be directly linked to form a series of roll-to-roll processes that successively form each layer. More specifically, the first electrode layer, the electrolyte layer, and the second electrode layer may be successively formed on a current collector supplied from the supply roller, and the current collector having a unit of the electrode stack formed thereon can be wound by the winding roller. In this manner, the process cost and tact time can be reduced.

A current collecting layer may further be formed, for example, using conductive paste on the integrated type unit produced as described above and including the first electrode layer, the electrolyte layer, and the second electrode layer. In this case, conductive paste including a publicly known material exhibiting conductivity and a publicly known binder as the second binder may be used as the conductive paste. Examples of the conductive paste include silver paste, carbon paste, copper paste, gold paste, aluminum paste, tin paste, and mixed paste of the above pastes.

The conductive paste can be applied onto, for example, the second electrode layer in the same manner as applying the material slurry of each layer of the electrode stack. By drying the applied coat of the conductive paste, a current collecting layer bound to the second electrode layer can be formed. When a current collecting layer is formed as described above, the conductive paste conforms to the surface shape of the second electrode layer and thus, adhesion properties of the second electrode layer and the current collecting layer can be improved. In this case, mechanical strength can be increased and at the same time, conductivity is improved and thus, battery resistance can be reduced.

When an electrode group is formed by stacking two or more electrode stacks, an electrode group can be obtained, for example, by stacking integrated type units of the electrode stack including the first electrode layer, the electrolyte layer, and the second electrode layer produced as described above. When, for example, an integrated type unit of the electrode stack is produced by forming the first electrode layer on a current collector made of foil (current collecting foil) as a current collecting layer and then successively forming the electrolyte layer and the second electrode layer, an electrode group in which plural electrode stack units is stacked can be obtained by stacking similarly configured units onto the second electrode layer at the top.

Alternatively, an electrode group integrally bound as a whole while including plural electrode stack units can be produced as described below. For example, a current collecting layer is formed as described above, by applying conductive paste onto the second electrode layer on the top surface of the electrode stack and drying the conductive paste. Next, a first electrode layer is formed on the formed current collecting layer in a manner similar to the above described procedures. Subsequently, following the above described procedures, an electrolyte layer and a second electrode layer are successively formed. Then, by repeatedly forming the current collecting layer, the first electrode layer, the electrolyte layer, and the second electrode layer in this order, an electrode group including a desired number of electrode stack units where all units are integrated together can be produced. In this manner, an electrode of a bipolar structure exhibiting excellent ionic conductivity and excellent electric conductivity due to having high adhesion properties between layers and also exhibiting excellent life performance due to high mechanical strength can be obtained.

In addition, when a stack type electrode group is produced by repeating the first electrode layer, the electrolyte layer, the second electrode layer, and the current collecting layer obtained by drying conductive paste, the single-side application method can be used for the formation of all layers and thus, for example, even when plural electrode stack units are included, all manufacturing processes of an electrode group is able to be consecutively performed.

<Measuring Method>

Components included in each layer of an electrode stack can be measured as described below.

When the electrode stack to be measured is included in a battery, first, the already assembled battery is discharged to a safe voltage to prevent an electric shock. Next, the battery is disassembled and the electrode group is taken out. Unnecessary impurities on the electrode surface are washed off by rocking or swirling the electrode group that has been taken out while immersing the electrode group in a solvent such as ethyl methyl carbonate, dimethyl carbonate, diethyl carbonate or the like for 2 min to 3 min. The washed electrode group is sufficiently dried by vacuum drying.

Next, the electrode group is cut into desired sizes and the cross section thereof is polished by the CP (Cross-section Polishing) method. Here, the electrode group is divided into the positive electrode, the negative electrode, and the separator (electrolyte layer) if necessary. In the CP method, a measuring sample is irradiated with a broad Ar ion beam to perform etching by sputtering. In this manner, the measuring sample to be subjected to analysis is prepared.

$NH_4^+$ derived from CMC ammonium salt can be detected by conducting an analysis of the measuring sample by the Time of Flight Secondary Ion Mass Spectrometry (TOF-SIMS). In TOF-SIMS, components within the measuring sample are separated by mass by irradiating the target measuring sample with pulsed primary ions and precisely measuring a difference of times of flight (function of the mass) from the release of secondary ions from the surface of the measuring sample to the entry into a mass spectrometer. By using TOF-SIMS, $NH_4^+$ can be detected with very high sensitivity.

$Na^+$ derived from CMC sodium salt can be detected by conducting an analysis of the measuring sample by the Electron Probe Micro Analyzer (EPMA). Using EPMA, an element included in a substance can be identified by detecting characteristic X-rays. Characteristic X-rays here refer to X-rays released when atoms return to the ground state after being excited by energy from outside (an electron beam in the case of EPMA).

Also, by conducting an analysis by EPMA, the first binder such as PVdF can be detected. More specifically, when, for example, PVdF is detected, fluorine derived from PVdF can be detected. As the method of detecting the first binder, a publicly known method can be used.

According to the embodiment described above, a battery including one or more electrode stack is provided. According to one aspect, the electrode stack is an electrode stack including the electrolyte layer including an electrolyte and carboxymethylcellulose sodium salt, the first electrode layer including the first active material and carboxymethylcellulose ammonium salt and bound to a surface of the electrolyte layer, and the second electrode layer including the second active material and the first binder soluble in an organic solvent and bound to the surface on a reverse side to the surface on which the first electrode layer is bound to the electrolyte layer.

According to another aspect, the electrode stack is an electrode stack including the electrolyte layer including an electrolyte and carboxymethylcellulose ammonium salt, the first electrode layer including the first active material and the first binder soluble in an organic solvent and bound to a surface of the electrolyte layer, and the second electrode layer including the second active material and carboxymethylcellulose sodium salt and bound to the surface on a reverse side to the surface on which the first electrode layer is bound to the electrolyte layer.

In the electrode stack, ionic conductivity is improved by virtue of high adhesion properties between layers. As a result, a battery according to the first embodiment exhibits excellent output performance and excellent life performance.

(Second Embodiment)

According to a second embodiment, a battery pack is provided. The battery pack includes the battery according to the first embodiment.

The battery pack according to the second embodiment may include one or more batteries (unit cells) according to the first embodiment described above. The plural batteries, which may be included in the battery pack according to the second embodiment, may be electrically connected in series, in parallel, or in a combination of in a series and in parallel. The plural batteries may be electrically connected in series or in parallel, to configure a battery module. The battery pack according to the second embodiment may include plural battery modules.

The battery pack according to the second embodiment may further include a protective circuit. The protective circuit has a function to control charging and discharging of the battery. Alternatively, a circuit included in equipment where the battery pack serves as a power source (for example, electronic devices, vehicles, and the like) may be used as the protective circuit for the battery pack.

Moreover, the battery pack according to the second embodiment may further include an external power distribution terminal. The external power distribution terminal is configured to externally output current from the battery, and to input current to the battery. In other words, when the battery pack is used as a power source, the current is externally provided via the external power distribution terminal. When the battery pack is charged, the charging current (including regenerative energy caused by power of vehicles such as automobiles) is provided to the battery pack via the external power distribution terminal.

Next, an example of a battery pack according to the second embodiment will be described with reference to the drawings.

Figure 7:
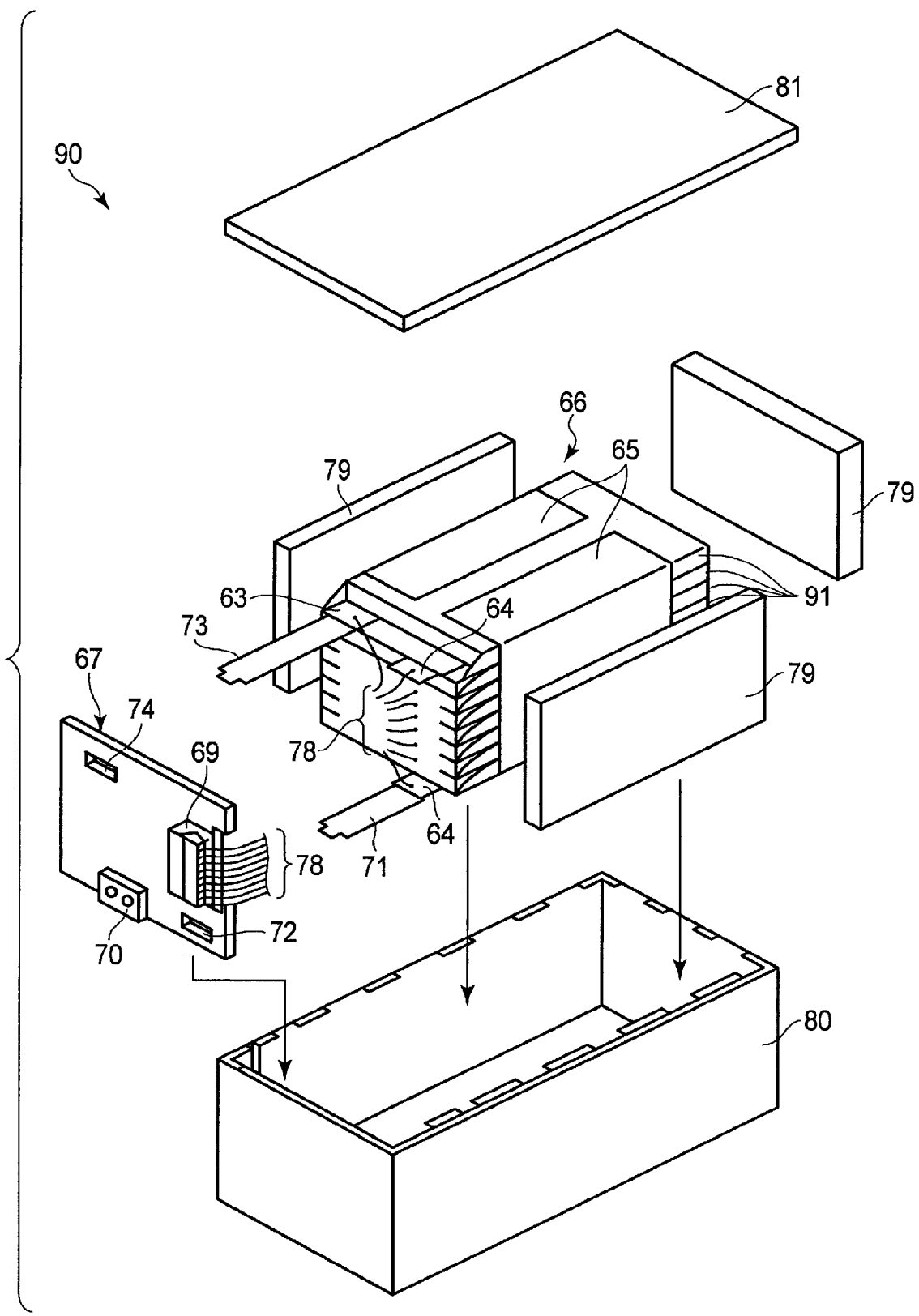
FIG. 7 is an exploded perspective view of an exemplary battery pack according to a second embodiment.
Figure 8:
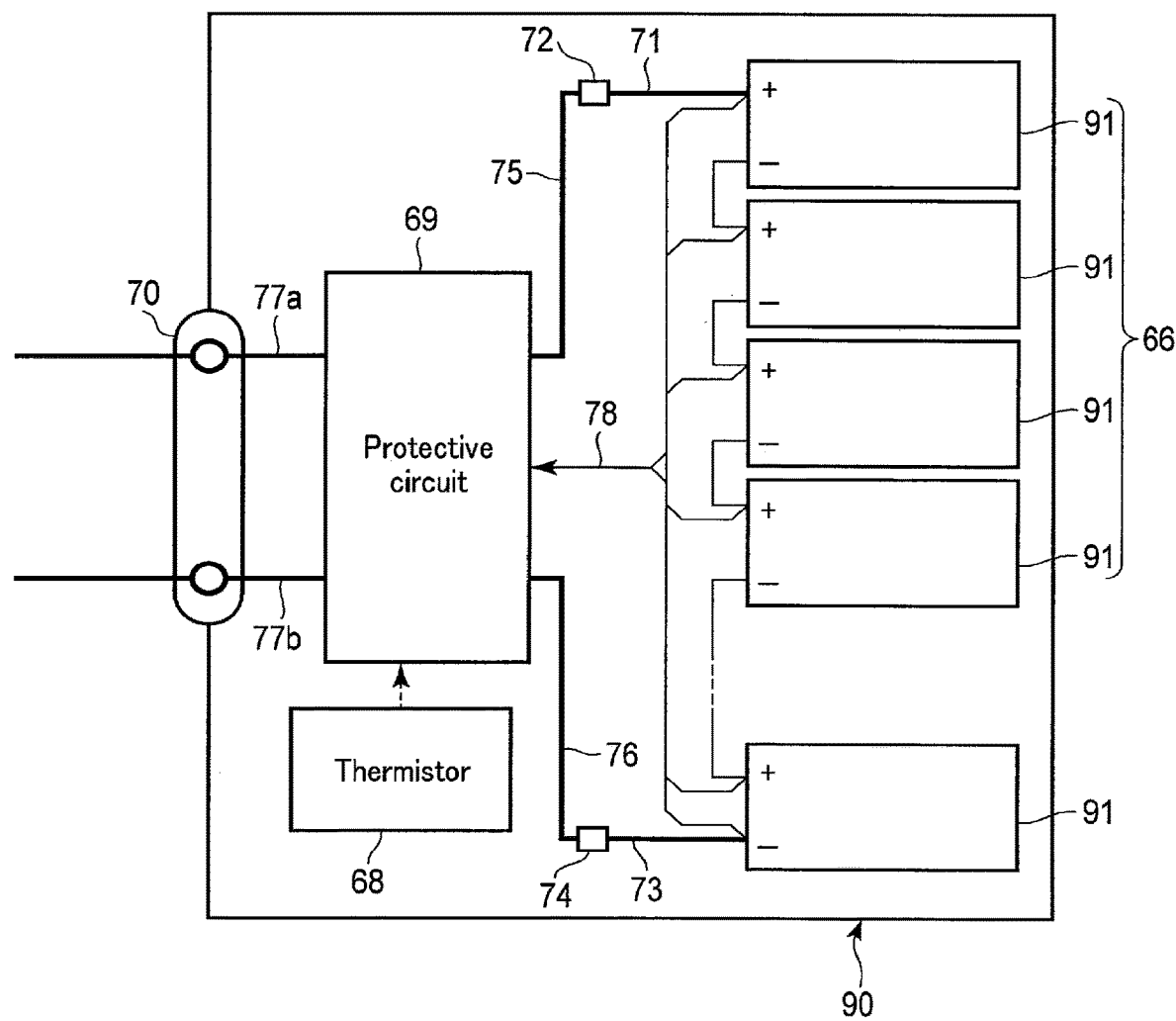
FIG. 8 is a block diagram showing an electric circuit of the battery pack in FIG. 7.

FIG. 7 is an exploded perspective view schematically showing features of the battery pack according to the second embodiment. FIG. 8 is a block diagram showing an electric circuit of the battery pack 90 of FIG. 7. A battery pack 90 shown in FIGS. 7 and 8 includes plural unit cells 91. The plural unit cells 91 may be batteries 50 described with reference to FIG. 5.

Plural unit cells 91 are stacked so that the negative electrode terminals 63 and the positive electrode terminals 64 extended outside are arranged in the same direction, and fastened with an adhesive tape 65 to configure a battery module 66. The unit cells 91 are electrically connected to each other in series as shown in FIG. 8.

A printed wiring board 67 is disposed to face opposite to the side plane where the negative electrode terminal 63 and the positive electrode terminal 64 of the batteries 91 extend out from. A thermistor 68, a protective circuit 69, and an external power distribution terminal 70 are mounted on the printed wiring board 67 as shown in FIG. 8. An electric insulating plate (not shown) is attached to the surface of the printed wiring board 67 facing the battery module 66 to avoid unnecessary connection with the wires of the battery module 66.

A positive electrode-side lead 71 is connected to the positive electrode terminal 64 located at the bottom layer of the battery module 66 and the distal end of the lead 71 is inserted into a positive electrode-side connector 72 of the printed wiring board 67 so as to be electrically connected. A negative electrode-side lead 73 is connected to the negative electrode terminal 63 located at the top layer of the battery module 66 and the distal end of the lead 73 is inserted into an negative electrode-side connector 74 of the printed wiring board 67 so as to be electrically connected. The connectors 72 and 74 are connected to the protective circuit 67 through wires 75 and 76 formed on the printed wiring board 69.

The thermistor 68 detects the temperature of the unit cells 91, and the detection signal is sent to the protective circuit 69. The protective circuit 69 can shut down a plus-side wire 77a and a minus-side wire 77b between the protective circuit 69 and the external power distribution terminal 70, under a predetermined condition. The predetermined condition indicates, for example, the case where the temperature detected by the thermistor 68 becomes a predetermined temperature or more. Another example of the predetermined condition is, for example when over-charge, over-discharge, or over-current of the unit cells 91 is detected. The detection of the over-charge and the like is performed on each of the unit cells 91 or the entire battery module 66.

When each of the unit cells 91 is detected, the cell voltage may be detected, or the positive electrode or negative electrode potential may be detected. In the latter case, a lithium electrode to be used as a reference electrode is inserted into each of the unit cells 91. In the case of the battery pack 90 of FIGS. 7 and 8, wires 78 for voltage detection are connected to each of the unit cells 91. Detection signals are sent to the protective circuit 69 through the wires 78.

Protective sheets 79 made of rubber or resin are arranged on three side planes of the battery module 66 except the side plane from which the positive electrode terminal 64 and the negative electrode terminal 63 protrude out from.

The battery module 66 is housed in a housing container 80 together with each of the protective sheets 79 and the printed wiring board 67. That is, the protective sheets 79 are arranged on both internal surfaces in a long side direction and on one internal surface in a short side direction of the housing container 80. The printed wiring board 67 is arranged on the internal surface on the opposite side in a short side direction. The battery module 66 is located in a space surrounded by the protective sheets 79 and the printed wiring board 67. A lid 81 is attached to the upper surface of the housing container 80.

In order to fix the battery module 66, a heat-shrinkable tape may be used in place of the adhesive tape 65. In this case, the battery module is bound by placing the protective sheets on the both sides of the battery module, revolving the heat-shrinkable tape around the battery module and protective sheets, and thermally shrinking the heat-shrinkable tape.

In FIGS. 7 and 8, an embodiment has been shown where unit cells 91 are connected in series; however, the connection may be made in parallel in order to increase battery capacity. Alternatively, connection in series may be combined with connection in parallel. Assembled battery packs 90 may be connected further in series and/or in parallel.

Furthermore, although the battery pack shown in FIGS. 7 and 8 include plural unit cells 91, the battery pack according to the third embodiment may include only one unit cell 91.

The aspect of the battery pack may be appropriately changed depending on its application. The battery pack 90 is preferably used in applications in which good cycle performance is desirable along with large current performance. Specific examples of use for the battery pack include a power source of a digital camera, use for installing on a vehicle such as a two- to four-wheeled hybrid electric automobile, a two- to four-wheeled electric automobile, a power-assisted bicycle, or a railway car, and use as a stationary battery. In particular, the battery pack 90 is suitably used for a battery installed on a vehicle.

In a vehicle, such as an automobile, onto which the battery pack according to the second embodiment has been installed, the battery pack is configured, for example, to recover regenerative energy caused by power of the vehicle. Examples of the vehicle include two to four-wheeled hybrid electric automobiles, two to four-wheeled electric automobiles, electric assist bicycles, and railway cars such as electric trains.

The battery pack according to the second embodiment includes the battery according to the first embodiment. Thus, the battery pack according to the second embodiment can exhibit excellent output performance and excellent life performance.

(Third Embodiment)

According to a third embodiment, a vehicle is provided. The vehicle here refers to a two-wheeled to four-wheeled hybrid electric vehicle that combines and uses an internal combustion engine and a battery-driven motor as a travel power source, a two-wheeled to four-wheeled electric vehicle that uses only a battery-driven motor as a travel power source, a power assisted bicycle that combines human strength with the power source, a railway car that uses a battery-driven motor as a travel power source and the like.

As a driving force of a vehicle such as an automobile, a power source of a wide range of engine speed and torque becomes necessary in accordance with traveling conditions. In general, there is a limit to the torque and engine speed in which ideal energy efficiency is exhibited by the internal combustion engine and thus, energy efficiency decreases under other driving conditions. An automobile of the hybrid type is characterized in that energy efficiency of the whole automobile can be improved by generating electric power by operating the internal combustion engine under optimal conditions, while driving the wheels by a highly efficient motor or driving the wheels by combining power of the internal combustion engine and the motor. Also, by regenerating kinetic energy (motive energy) of the vehicle during deceleration as electric power, when compared with an ordinary automobile driven with the internal combustion engine alone, the travel distance per unit fuel can dramatically be increased.

An electric vehicle (EV) is driven using energy stored in a battery pack, which is charged by supplying electric power from outside the automobile. Thus, the electric vehicle can use electric energy generated with high efficiency using other power generation facilities. Also, kinetic energy (motive energy) of the automobile can be regenerated during deceleration and therefore, energy efficiency during traveling can be improved. Electric vehicles do not emit carbon dioxide and other exhaust gases at all, and so are clean automobiles. On the other hand, power during traveling comes all from a motor and thus, a high-power motor is needed. In general, it is necessary to travel with all energy needed for one travel stored upon charging once and thus, batteries of very large capacities are needed. For example, a battery pack whose rated capacity is within the range of from 100 Ah to 500 Ah is desirable. A more desirable range is from 200 Ah to 400 Ah.

The vehicle according to the third embodiment includes the battery pack according to the second embodiment. The battery pack is suitable for installing on vehicles such as two-wheeled to four-wheeled hybrid electric vehicles, two-wheeled to four-wheeled electric vehicles, assisted bicycles, railway cars described above, and the like. Thus, a vehicle according to the third embodiment having such a battery pack installed can exhibit good performance. Also, as described above, layers in the electrode stack according to an embodiment are highly in close contact by being bound in an integrated manner and thus, can exhibit high durability toward vibrations or the like from outside. Also from this reason, the battery pack according to an embodiment can suitably be used for installing on vehicles.

While the battery is discharged while a vehicle travels, the battery cannot be discharged in a stable manner if, for example, contact stability at the interface between layers of the electrode group inside the battery is low. Further, portions where the interface resistance is high do not contribute to the discharge, and thus, the current is concentrated in portions where the interface resistance is low. As a result, the material of the portions where the current is concentrated may become extremely degraded. Also, if the proportional ratio of portions where the interface resistance is high increases, heat generation increases correspondingly as Joule heat and as a result, the degradation of materials inside the whole battery is more likely to proceed. Therefore, a battery according to an embodiment in which the interface resistance is stabilized by each layer being in close contact and a battery pack including the battery can be installed on a vehicle and used suitably.

Because in a vehicle such as an automobile, the proportional ratio of the battery weight of a battery pack to the vehicle weight is large, it is preferable to install the battery pack in a low position by, for example, packing the battery pack underneath the floor and also in a position that does not significantly deviate from the center of gravity of the vehicle. In order to charge a large amount of electric power corresponding to one travel in a short time, a charger and outlet cable having large capacities are needed. Thus, the vehicle is desirably equipped with a charging connector to connect to the charger and the outlet cable. As the charging connector, a common connector based on electric contact can be used, but a non-contact charging connector based on electromagnetic coupling may also be used.

When a non-contact charging connector is used, there is anticipation of the future possibility of charging while traveling, by traveling over charging apparatuses embedded in a road. In such a case, for reasons similar to those when discharging, if, for example, contact stability at the interface between layers of the electrode group inside the battery is low, the battery cannot be charged in a stable manner and also, the degradation of materials inside the batter is more likely to occur. In the battery and the battery pack according to an embodiment, layers of the electrode stack are highly in close contact and thus, the battery can be charged in a stable manner even while the vehicle travels.

Figure 9:
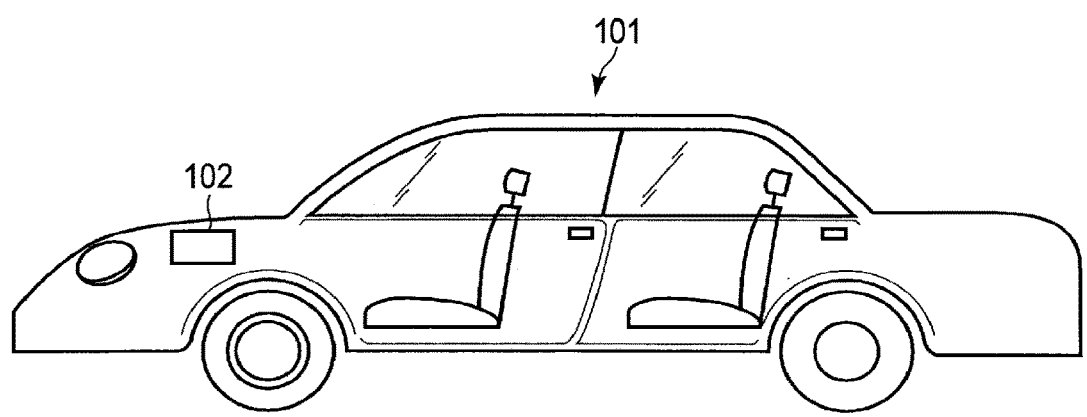
FIG. 9 is a schematic diagram showing an exemplary automobile, as an example of a vehicle according to a third embodiment.

FIG. 9 shows an automobile as an example of a vehicle according to the third embodiment.

The automobile 101 shown in FIG. 9 includes a battery pack 102, which is an example of the battery pack according to the second embodiment, installed in its engine compartment. The installing position is not limited to engine compartments. For example, the battery pack may also be installed in rear sections (for example, underneath the vehicle floor, on the rear side of seat backs, at lower sections of the rear trunk compartment) of automobiles or under seats.

The vehicle according to the third embodiment includes the battery pack according to the third embodiment. According to the third embodiment, provided is a vehicle including a battery pack that exhibits excellent output performance and excellent life performance.

EXAMPLES

Example 1

<Production of Electrode Stack>

In Example 1, an integrated unit as an electrode stack was produced as described below.

First, $Nb_2TiO_7$ whose average particle size is 5 μm was prepared as a negative electrode active material. As materials of the negative electrode layer, the negative electrode active material, acetylene black powder and graphite powder as conductive agents, and carboxymethylcellulose ammonium salt powder and styrene-butadiene rubber were used. The mixing ratio of these negative electrode materials was 93:1.5:3.5:1:1 as a weight ratio. The negative electrode materials were mixed in the following order. First, carboxymethylcellulose ammonium salt was dissolved in pure water and then, acetylene black was dispersed therein, next graphite was dispersed, $Nb_2TiO_7$ was dispersed therein, and lastly styrene-butadiene rubber was mixed in. The slurry obtained in this manner was applied to aluminum foil having a thickness of 15 μm and an average crystal particle size of 30 μm. The applied slurry of negative electrode materials was dried in a drying oven to form a negative electrode layer.

Subsequently, a composite electrolyte material layer was formed on the top surface of the negative electrode layer as described below. As materials of the composite electrolyte layer, $Li_7La_3Zr_2O_{12}$ particles whose primary particle size (average particle size) is 1 μm, carboxymethylcellulose sodium salt, and styrene-butadiene rubber were used. The mixing ratio of these electrolyte layer materials was 98:1:1 as a weight ratio. The electrolyte layer materials were mixed in the following order. First, carboxymethylcellulose sodium salt was dissolved in pure water and then, $Li_7La_3Zr_2O_{12}$ was dispersed therein, and lastly styrene-butadiene rubber was mixed in. The slurry obtained as described above was applied onto the negative electrode layer by the microgravure method. The applied slurry of electrolyte materials was dried in a drying oven to form a composite electrolyte layer.

Subsequently, a positive electrode layer was formed on the top surface of the composite electrolyte material layer as described below. Lithium-cobalt composite oxide ($LiCoO_2$) powder (18% by weight) and a ternary composite oxide ($LiNi_{0.6}Co_{0.2}Mn_{0.2}O_2$) powder (72% by weight) as positive electrode active materials, acetylene black (4% by weight), graphite (4% by weight), and polyvinylidene difluoride (PVdF) (2% by weight) were added to N-methyl pyrrolidone (NMP) and mixed to prepare a slurry. The slurry was applied onto the composite electrolyte layer. The applied slurry of positive electrode materials was dried in a drying oven to form a positive electrode layer.

The stack obtained by drying was subjected to pressing to produce an electrode stack (integrated unit) of Example 1. Here, the pressing pressure was adjusted so that the density of the electrode stack as a whole is 3.2 g/cm$^3$.

<Production of Three-electrode Cell>

A three-electrode cell was produced by the method described below.

Two sets of 2×2 cm size of the electrode stack produced as described above were cut out, and the two sets were stacked. Aluminum foil having the thickness of 15 μm and the average crystal particle size of 30 μm was stacked thereon. One end each of electrode lead wires was connected respectively to the aluminum foil on the bottom and the aluminum foil on the top, and the other end of each electrode lead was inserted into a three-electrode glass cell. Also, a lithium metal was inserted into the glass cell as a reference electrode. 1 mol/L of lithium hexafluorophosphate ($LiPF_6$) was dissolved in a solvent in which ethylene carbonate and diethyl carbonate were mixed in the volume ratio of 1:2 to prepare an electrolyte solution. 25 mL of the electrolyte solution was poured into the glass cell to impregnate the electrode stack with the electrolyte solution. Then, the glass container was sealed to produce a three-electrode cell of Example 1.

Example 2

In Example, 2, first 1 wt % of carbon coat was disposed on the particle surface of $Nb_2TiO_7$ as negative electrode active material. Excluding the use of the $Nb_2TiO_7$ that had been carbon coated in this manner, a three-electrode cell of Example 2 was produced in the same manner as in Example 1.

Example 3

In Example 3, excluding the change of the primary particle size (average particle size) of $Li_7La_3Zr_2O_{12}$ particles as a material of the composite electrolyte layer to 10 μm, a three-electrode cell of Example 3 was produced in the same manner as in Example 1.

Example 4

In Example 4, excluding the use of $Al_2O_3$ particles whose primary particle size (average particle size) is 1 μm, instead of $Li_7La_3Zr_2O_{12}$ particles, a three-electrode cell of Example 4 was produced in the same manner as in Example 1.

Example 5

In Example 5, excluding the use of $Li_4Ti_5O_{12}$ (LTO) whose average particle size is 1 μm as the negative electrode active material of the negative electrode layer, a three-electrode cell of Example 5 was produced in the same manner as in Example 1.

Example 6

In Example 6, first 1 wt % of carbon coat was disposed on the particle surface of LTO as negative electrode active material. Excluding the use of LTO that had been carbon coated in this manner, a three-electrode cell of Example 6 was produced in the same manner as in Example 5.

Example 7

In Example 7, excluding the change of the primary particle size (average particle size) of $Li_7La_3Zr_2O_{12}$ particles as a material of the composite electrolyte layer to 10 µm, a three-electrode cell of Example 7 was produced in the same manner as in Example 5.

Example 8

In Example 8, excluding the use of $Al_2O_3$ particles whose primary particle size (average particle size) is 1 µm, instead of $Li_7La_3Zr_2O_{12}$ particles, a three-electrode cell of Example 8 was produced in the same manner as in Example 5.

Example 9

In Example 9, excluding the use of $Li_{2.2}Na_{1.5}Ti_{5.5}Nb_{0.5}O_{14}$ particles whose average particle size is 10 µm as the negative electrode active material of the negative electrode layer, a three-electrode cell of Example 9 was produced in the same manner as in Example 1.

Example 10

In Example, 10, first 1 wt % of carbon coat was disposed on the particle surface of $Li_{2.2}Na_{1.5}Ti_{5.5}Nb_{0.5}O_{14}$ as negative electrode active material. Excluding the use of $Li_{2.2}Na_{1.5}Ti_{5.5}Nb_{0.5}O_{14}$ that had been carbon coated in this manner, a three-electrode cell of Example 10 was produced in the same manner as in Example 9.

Example 11

In Example 11, excluding the change of the primary particle size (average particle size) of $Li_7La_3Zr_2O_{12}$ particles as a material of the composite electrolyte layer to 10 µm, a three-electrode cell of Example 11 was produced in the same manner as in Example 9.

Example 12

In Example 12, excluding the use of $Al_2O_3$ particles whose primary particle size (average particle size) is 1 µm, instead of $Li_7La_3Zr_2O_{12}$ particles, a three-electrode cell of Example 12 was produced in the same manner as in Example 9.

Example 13

<Production of Electrode Stack>
In Example 13, an integrated unit as an electrode stack was produced as described below.
First, lithium-cobalt composite oxide ($LiCoO_2$) powder (18% by weight) and a ternary composite oxide ($LiNi_{0.6}Co_{0.2}Mn_{0.2}O_2$) powder (72% by weight) as positive electrode active materials, acetylene black (4% by weight), graphite (4% by weight), and polyvinylidene difluoride (PVdF) (2% by weight) were added to N-methyl pyrrolidone (NMP) and mixed to prepare a slurry. The slurry was applied to aluminum foil having a thickness of 15 µm and an average crystal particle size of 30 µm. The applied slurry of positive electrode materials was dried in a drying oven to form a positive electrode layer.

Subsequently, a composite electrolyte layer was formed on the top surface of the positive electrode layer as described below. As materials of the composite electrolyte layer, $Li_7La_3Zr_2O_{12}$ particles whose primary particle size (average particle size) is 1 µm, carboxymethylcellulose ammonium salt, and styrene-butadiene rubber were used. The mixing ratio of these electrolyte layer materials was 98:1:1 as a weight ratio. The electrolyte layer materials were mixed in the following order. First, carboxymethylcellulose ammonium salt was dissolved in pure water and then, $Li_7La_3Zr_2O_{12}$ was dispersed therein, and lastly styrene-butadiene rubber was mixed in. The slurry obtained as described above was applied onto the positive electrode layer by the micro-gravure method. The applied slurry of electrolyte materials was dried in a drying oven to form a composite electrolyte layer.

Subsequently, a negative electrode layer was formed on the top surface of the composite electrolyte material layer as described below. $Nb_2TiO_7$ whose average particle size is 5 µm was prepared as a negative electrode active material. As materials of the negative electrode layer, the negative electrode active material, acetylene black powder and graphite powder as conductive agents, and carboxymethylcellulose sodium salt powder and styrene-butadiene rubber were used. The mixing ratio of these negative electrode materials was 93:1.5:3.5:1:1 as a weight ratio. The negative electrode materials were mixed in the following order. First, carboxymethylcellulose sodium salt was dissolved in pure water and then, acetylene black was dispersed therein, next graphite was dispersed, $Nb_2TiO_7$ was dispersed therein, and lastly styrene-butadiene rubber was mixed in. The slurry obtained as described above was applied onto the composite electrolyte layer. The applied slurry of negative electrode materials was dried in a drying oven to form a negative electrode layer.

The obtained stack was subjected to pressing to produce an electrode stack (integrated unit) of Example 13. Here, the pressing pressure was adjusted so that the density of the electrode stack as a whole is 3.2 g/cm$^3$.

<Production of Three-electrode Cell>
In Example 13, excluding the use of the electrode stack of Example 13 produced as described above, a three-electrode cell of Example 13 was produced in the same manner as in Example 1.

Example 14

<Production of Electrode Stack>
In Example 14, an integrated unit as an electrode stack was produced as described below.
First, lithium-cobalt composite oxide ($LiCoO_2$) powder (18% by weight) and ternary composite oxide ($LiNi_{0.6}Co_{0.2}Mn_{0.2}O_2$) powder (72% by weight) as positive electrode active materials, acetylene black (4% by weight), graphite (4% by weight), carboxymethylcellulose ammonium salt (1% by weight), and styrene-butadiene rubber (1% by weight) were mixed. These positive electrode materials were mixed in the following order. First, carboxymethylcellulose ammonium salt was dissolved in pure water and then, acetylene black and graphite were dispersed therein, next the positive electrode active materials were mixed in, and lastly styrene-butadiene rubber was mixed in. The slurry obtained in this manner was applied to aluminum foil having a thickness of 15 µm and an average crystal particle size of 30 µm. The applied slurry of positive electrode materials was dried in a drying oven to form a positive electrode layer.

Subsequently, a composite electrolyte material layer was formed on the top surface of the positive electrode layer as described below. As materials of the composite electrolyte layer, $Li_7La_3Zr_2O_{12}$ particles whose primary particle size (average particle size) is 1 µm, carboxymethylcellulose sodium salt, and styrene-butadiene rubber were used. The mixing ratio of these electrolyte layer materials was 98:1:1 as a weight ratio. The electrolyte layer materials were mixed in the following order. First, carboxymethylcellulose sodium salt was dissolved in pure water and then, $Li_7La_3Zr_2O_{12}$ was dispersed therein, and lastly styrene-butadiene rubber was mixed in. The slurry obtained as described above was applied onto the negative electrode layer by the micro-gravure method. The applied slurry of electrolyte materials was dried in a drying oven to form a composite electrolyte layer.

Subsequently, a negative electrode layer was formed on the top surface of the composite electrolyte material layer as described below. $Nb_2TiO_7$ whose average particle size is 5 µm was prepared as a negative electrode active material. As materials of the negative electrode layer, the negative electrode active material powder (93% by weight), acetylene black powder (2.5% by weight), graphite powder (2.5% by weight), and polyvinylidene difluoride (PVdF) (2% by weight) were added to N-methyl pyrrolidone (NMP) and mixed to prepare a slurry. The slurry obtained as described above was applied onto the composite electrolyte layer. The applied slurry of negative electrode materials was dried in a drying oven to form a negative electrode layer.

The stack obtained by drying was subjected to pressing to produce the electrode stack (integrated unit) of Example 14. Here, the pressing pressure was adjusted so that the density of the electrode stack as a whole is 3.2 g/cm³.

<Production of Three-electrode Cell>

In Example 14, excluding the use of the electrode stack of Example 14 produced as described above, a three-electrode cell of Example 14 was produced in the same manner as in Example 1.

Example 15

In Example 15, an integrated unit as an electrode stack was produced as described below.

First, $Nb_2TiO_7$ whose average particle size is 5 µm was prepared as a negative electrode active material. As materials of the negative electrode layer, the negative electrode active material powder (93% by weight), acetylene black powder (2.5% by weight), graphite powder (2.5% by weight), and polyvinylidene difluoride (PVdF) (2% by weight) were added to N-methyl pyrrolidone (NMP) and mixed to prepare a slurry. The slurry was applied to aluminum foil having a thickness of 15 µm and an average crystal particle size of 30 µm. The applied slurry of negative electrode materials was dried in a drying oven to form a negative electrode layer.

Next, a composite electrolyte layer was formed on the top surface of the negative electrode layer as described below. As materials of the composite electrolyte layer, $Li_7La_3Zr_2O_{12}$ particles whose primary particle size (average particle size) is 1 µm, carboxymethylcellulose ammonium salt, and styrene-butadiene rubber were used. The mixing ratio of these electrolyte layer materials was 98:1:1 as a weight ratio. The electrolyte layer materials were mixed in the following order. First, carboxymethylcellulose ammonium salt was dissolved in pure water and then, $Li_7La_3Zr_2O_{12}$ was dispersed therein, and lastly styrene-butadiene rubber was mixed in. The slurry obtained as described above was applied onto the negative electrode layer by the micro-gravure method. The applied slurry of electrolyte materials was dried in a drying oven to form a composite electrolyte layer.

Subsequently, lithium-cobalt composite oxide ($LiCoO_2$) powder (18% by weight) and ternary composite oxide ($LiNi_{0.6}Co_{0.2}Mn_{0.2}O_2$) powder (72% by weight) as positive electrode active materials, acetylene black (4% by weight), graphite (4% by weight), carboxymethylcellulose sodium salt (1% by weight), and styrene-butadiene rubber (1% by weight) were mixed. These positive electrode materials were mixed in the following order. First, carboxymethylcellulose sodium salt was dissolved in pure water and then, acetylene black and graphite were dispersed therein, next the positive electrode active materials were mixed in, and lastly styrene-butadiene rubber was mixed in. The slurry obtained in this manner was applied onto the composite electrolyte layer. The applied slurry of positive electrode materials was dried in a drying oven to form a positive electrode layer.

The stack obtained by drying was subjected to pressing to produce an electrode stack (integrated unit) of Example 15. Here, the pressing pressure was adjusted so that the density of the electrode stack as a whole is 3.2 g/cm³.

<Production of Three-electrode Cell>

In Example 15, excluding the use of the electrode stack of Example 15 produced as described above, a three-electrode cell of Example 15 was produced in the same manner as in Example 1.

Comparative Example 1

<Production of Electrode Stack>

$Nb_2TiO_7$ whose average particle size is 5 µm was prepared as a negative electrode active material. As materials of the negative electrode layer, the negative electrode active material powder (93% by weight), acetylene black powder (2.5% by weight), graphite powder (2.5% by weight), and polyvinylidene difluoride (PVdF) (2% by weight) were prepared. These negative electrode materials were added to N-methyl pyrrolidone (NMP) and mixed to prepare a slurry. The slurry obtained as described above was applied to aluminum foil having a thickness of 15 µm and an average crystal particle size of 30 µm. The applied slurry of negative electrode materials was dried in a drying oven to form a negative electrode layer.

Subsequently, a composite electrolyte material layer was formed on the top surface of the negative electrode layer as described below. As materials of the composite electrolyte layer, $Li_7La_3Zr_2O_{12}$ particles whose primary particle size (average particle size) is 1 µm and polyvinylidene difluoride (PVdF) were mixed in a mixing ratio of 98:2. The slurry obtained as described above was applied onto the negative electrode layer by the micro-gravure method. The applied slurry of electrolyte materials was dried in a drying oven to form a composite electrolyte layer.

Subsequently, lithium-cobalt composite oxide ($LiCoO_2$) powder (18% by weight) and ternary composite oxide ($LiNi_{0.6}Co_{0.2}Mn_{0.2}O_2$) powder (72% by weight) as positive electrode active materials, acetylene black (4% by weight), graphite (4% by weight), and polyvinylidene difluoride (PVdF) (2% by weight) were added to N-methyl pyrrolidone (NMP) and mixed to prepare a slurry. The slurry was applied onto the composite electrolyte layer. The applied slurry of positive electrode materials was dried in a drying oven to form a positive electrode layer.

The stack obtained by drying was subjected to pressing to produce an electrode stack of Comparative Example 1. Here, the pressing pressure was adjusted so that the density of the electrode stack as a whole is 3.2 g/cm$^3$.

<Production of Three-electrode Cell>

In Comparative Example 1, excluding the use of the electrode stack of Comparative Example 1 produced as described above, a three-electrode cell of Comparative Example 1 was produced in the same manner as in Example 1.

Comparative Example 2

<Production of Electrode Stack>

In Comparative Example 2, first to third integrated units as electrode stacks were produced as described below.

First, the first integrated unit was produced as described below.

$Nb_2TiO_7$ particles whose average particle size is 5 μm were prepared as a negative electrode active material. As materials of the negative electrode layer, the negative electrode active material, acetylene black powder and graphite powder as conductive agents, and carboxymethylcellulose ammonium salt powder and styrene-butadiene rubber were used. The mixing ratio of these negative electrode materials was 93:1.5:3.5:1:1 as a weight ratio. The negative electrode materials were mixed in the following order. First, carboxymethylcellulose ammonium salt was dissolved in pure water and then, acetylene black was dispersed therein, next graphite was dispersed, $Nb_2TiO_7$ was dispersed therein, and lastly styrene-butadiene rubber was mixed in. The slurry obtained in this manner was applied to aluminum foil having a thickness of 15 μm and an average crystal particle size of 30 μm. The applied slurry of negative electrode materials was dried in a drying oven to form a first negative electrode layer.

Subsequently, a first composite electrolyte layer was formed on the top surface of the first negative electrode layer as described below. As materials of the composite electrolyte layer, $Li_7La_3Zr_2O_{12}$ particles whose primary particle size (average particle size) is 1 μm, carboxymethylcellulose sodium salt, and styrene-butadiene rubber were used. The mixing ratio of these electrolyte layer materials was 98:1:1 as a weight ratio. The electrolyte layer materials were mixed in the following order. First, carboxymethylcellulose sodium salt was dissolved in pure water and then, $Li_7La_3Zr_2O_{12}$ was dispersed therein, and lastly styrene-butadiene rubber was mixed in. The slurry obtained as described above was applied onto the first negative electrode layer by the micro-gravure method. The applied slurry of electrolyte materials was dried in a drying oven to form a first composite electrolyte layer.

The stack obtained by drying was subjected to pressing to produce a first integrated unit. Here, the pressing pressure was adjusted so that the density of the first integrated unit as a whole is 2.7 g/cm$^3$.

Subsequently, a second integrated unit was produced.

First, a first positive electrode layer was formed on another aluminum foil (thickness: 15 μm, average crystal particle size: 30 μm) as described below. Lithium-cobalt composite oxide ($LiCoO_2$) powder (18% by weight) and ternary composite oxide ($LiNi_{0.6}CO_{0.2}Mn_{0.2}O_2$) powder (72% by weight) as positive electrode active materials, acetylene black (4% by weight), graphite (4% by weight), and polyvinylidene difluoride (PVdF) (2% by weight) were added to N-methyl pyrrolidone (NMP) and mixed to prepare a slurry. The slurry was applied to aluminum foil having a thickness of 15 μm and an average crystal particle size of 30 μm. The applied slurry of positive electrode materials was dried in a drying oven to form a first positive electrode layer.

Subsequently, a second negative electrode layer was formed as described below on the surface opposite to the surface onto which the first positive electrode layer was formed. First, a negative electrode material slurry that is the same as the slurry used to form the first negative electrode layer in the first integrated unit was prepared. The slurry was applied onto the surface on the reverse side relative to the first positive electrode layer formed on the aluminum foil. The applied slurry of negative electrode materials was dried in a drying oven to form a second negative electrode layer.

Subsequently, a second composite electrolyte layer was formed on the second negative electrode layer as described below. First, a composite electrolyte material slurry that is the same as the slurry used to form the first composite electrolyte layer in the first integrated unit was prepared. The slurry was applied onto the second negative electrode layer by the micro-gravure method. The applied slurry of electrolyte materials was dried in a drying oven to form a second composite electrolyte layer.

The stack obtained by drying was subjected to pressing to produce a second integrated unit. Here, the pressing pressure was adjusted so that the density of the second integrated unit as a whole is 2.9 g/cm$^3$.

Subsequently, a third integrated unit was produced.

First, a positive electrode material slurry that is the same as the slurry used to form the first positive electrode layer in the second integrated unit was prepared. The slurry was applied onto still another aluminum foil (thickness: 15 μm, average crystal particle size: 30 μm). The applied slurry of positive electrode materials was dried in a drying oven to form a second positive electrode layer. The positive electrode layer obtained by drying and aluminum foil were subjected to pressing to produce a third integrated unit. Here, the pressing pressure was adjusted so that the density of the positive electrode layer is 3.2 g/cm$^3$.

<Production of Three-electrode Cell>

A three-electrode cell was produced by the method described below.

Each of the first to third integrated units produced as described above was cut into 2×2cm sizes. Subsequently, the first to third integrated units that had been cut were stacked in the order of aluminum foil-first negative electrode layer-first composite electrolyte layer-first positive electrode layer-aluminum foil-second negative electrode layer-second composite electrolyte layer-second positive electrode layer-aluminum foil. One end each of electrode lead wires was connected respectively to the aluminum foil of the first integrated unit and the aluminum foil of the third integrated unit, and the other end of each electrode lead was inserted into the three-electrode glass cell. Excluding the above, a three-electrode cell of Comparative Example 2 was produced in the same manner as in Example 1.

The configuration of each integrated unit of electrode stacks produced in Examples 1 to 14 and Comparative Examples 1 and 2 is summarized in Table 1 below.

TABLE 1

| | Negative Electrode Layer (Active Material/Binder) | Composite Electrolyte Layer (Electrolyte Particle/Binder) | Positive Electrode Layer (Active Material/Binder) |
|---|---|---|---|
| Example 1 | $Nb_2TiO_7$/ CMC (ammonium salt) | 1 μm size $Li_7La_3Zr_2O_{12}$/ CMC (sodium salt) | $LiCoO_2 + LiNi_{0.6}Co_{0.2}Mn_{0.2}O_2$/ PVdF |
| Example 2 | Carbon coated $Nb_2TiO_7$/ CMC (ammonium salt) | 1 μm size $Li_7La_3Zr_2O_{12}$/ CMC (sodium salt) | $LiCoO_2 + LiNi_{0.6}Co_{0.2}Mn_{0.2}O_2$/ PVdF |
| Example 3 | $Nb_2TiO_7$/ CMC (ammonium salt) | 10 μm size $Li_7La_3Zr_2O_{12}$/ CMC (sodium salt) | $LiCoO_2 + LiNi_{0.6}Co_{0.2}Mn_{0.2}O_2$/ PVdF |
| Example 4 | $Nb_2TiO_7$/ CMC (ammonium salt) | 1 μm size $Al_2O_3$/ CMC (sodium salt) | $LiCoO_2 + LiNi_{0.6}Co_{0.2}Mn_{0.2}O_2$/ PVdF |
| Example 5 | $Li_4Ti_5O_{12}$/ CMC (ammonium salt) | 1 μm size $Li_7La_3Zr_2O_{12}$/ CMC (sodium salt) | $LiCoO_2 + LiNi_{0.6}Co_{0.2}Mn_{0.2}O_2$/ PVdF |
| Example 6 | Carbon coated $Li_4Ti_5O_{12}$/ CMC (ammonium salt) | 1 μm size $Li_7La_3Zr_2O_{12}$/ CMC (sodium salt) | $LiCoO_2 + LiNi_{0.6}Co_{0.2}Mn_{0.2}O_2$/ PVdF |
| Example 7 | $Li_4Ti_5O_{12}$/ CMC (ammonium salt) | 10 μm size $Li_7La_3Zr_2O_{12}$/ CMC (sodium salt) | $LiCoO_2 + LiNi_{0.6}Co_{0.2}Mn_{0.2}O_2$/ PVdF |
| Example 8 | $Li_4Ti_5O_{12}$/ CMC (ammonium salt) | 1 μm size $Al_2O_3$/ CMC (sodium salt) | $LiCoO_2 + LiNi_{0.6}Co_{0.2}Mn_{0.2}O_2$/ PVdF |
| Example 9 | $Li_{2.2}Na_{1.5}Ti_{5.5}Nb_{0.5}O_{14}$/ CMC (ammonium salt) | 1 μm size $Li_7La_3Zr_2O_{12}$/ CMC (sodium salt) | $LiCoO_2 + LiNi_{0.6}Co_{0.2}Mn_{0.2}O_2$/ PVdF |
| Example 10 | Carbon coated $Li_{2.2}Na_{1.5}Ti_{5.5}Nb_{0.5}O_{14}$/ CMC (ammonium salt) | 1 μm size $Li_7La_3Zr_2O_{12}$/ CMC (sodium salt) | $LiCoO_2 + LiNi_{0.6}Co_{0.2}Mn_{0.2}O_2$/ PVdF |
| Example 11 | $Li_{2.2}Na_{1.5}Ti_{5.5}Nb_{0.5}O_{14}$/ CMC (ammonium salt) | 10 μm size $Li_7La_3Zr_2O_{12}$/ CMC (sodium salt) | $LiCoO_2 + LiNi_{0.6}Co_{0.2}Mn_{0.2}O_2$/ PVdF |
| Example 12 | $Li_{2.2}Na_{1.5}Ti_{5.5}Nb_{0.5}O_{14}$/ CMC (ammonium salt) | 1 μm size $Al_2O_3$/ CMC (sodium salt) | $LiCoO_2 + LiNi_{0.6}Co_{0.2}Mn_{0.2}O_2$/ PVdF |
| Example 13 | $Nb_2TiO_7$/ CMC (sodium salt) | 1 μm size $Li_7La_3Zr_2O_{12}$/ CMC (ammonium salt) | $LiCoO_2 + LiNi_{0.6}Co_{0.2}Mn_{0.2}O_2$/ PVdF |
| Example 14 | $Nb_2TiO_7$/ PVdF | 1 μm size $Li_7La_3Zr_2O_{12}$/ CMC (sodium salt) | $LiCoO_2 + LiNi_{0.6}Co_{0.2}Mn_{0.2}O_2$/ CMC (ammonium salt) |
| Example 15 | $Nb_2TiO_7$/ PVdF | 1 μm size $Li_7La_3Zr_2O_{12}$/ CMC (ammonium salt) | $LiCoO_2 + LiNi_{0.6}Co_{0.2}Mn_{0.2}O_2$/ CMC (sodium salt) |
| Comparative Example 1 | $Nb_2TiO_7$/ PVdF | 1 μm size $Li_7La_3Zr_2O_{12}$/ PVdF | $LiCoO_2 + LiNi_{0.6}Co_{0.2}Mn_{0.2}O_2$/ PVdF |
| Comparative Example 2 First Unit | $Nb_2TiO_7$/ CMC (ammonium salt) | 1 μm size $Li_7La_3Zr_2O_{12}$/ CMC (sodium salt) | — |
| Comparative Example 2 Second Unit | $Nb_2TiO_7$/ CMC (ammonium salt) | 1 μm size $Li_7La_3Zr_2O_{12}$/ CMC (sodium salt) | $LiCoO_2 + LiNi_{0.6}Co_{0.2}Mn_{0.2}O_2$/ PVdF |
| Comparative Example 2 Third Unit | — | — | $LiCoO_2 + LiNi_{0.6}Co_{0.2}Mn_{0.2}O_2$/ PVdF |

[Performance Evaluation]

<Output Performance>

Output performance (rate performance) of the produced three-electrode cells of Examples 1 to 14 and Comparative Examples 1 and 2 was evaluated. More specifically, a charge-and-discharge test was carried out under conditions described below.

Each of the produced three-electrode cells was placed in a thermostat at 25° C. and a constant current charge of 1.0 C was performed. Subsequently, a constant current discharge of 0.2 C was performed. Whereupon, the ratio of the capacity output during the discharge to the capacity input during the charge was calculated as the capacity retention ratio at the rate of 0.2 C. Furthermore, the current density during the discharge was changed to 1.0, 2.0, 3.0, 4.0, and 5.0 C, and the capacity retention ratio when discharged at each current density was determined in a manner similar to the case at 0.2 C rate.

<Life Performance>

Life performance (cycle performance) of the produced three-electrode cells of Examples 1 to 14 and Comparative Examples 1 and 2 was evaluated. More specifically, a charge-and-discharge cycle test was carried out under conditions described below.

Each of the produced three-electrode cells was placed in a thermostat at 45° C., and a charge-and-discharge cycle, in which one constant current charge of 1.0 C and one constant current discharge of 1.0 C was defined as one cycle, was repeated 100 times. Then, each three-electrode cell was placed in a thermostat at 25° C. and was charged and discharged at the constant current density of 1.0 C for both of the charge and discharge to determine the capacity retention ratio after 100 cycles.

Results of the output performance and life performance obtained for the three-electrode cells of Examples 1 to 14 and Comparative Examples 1 and 2 are summarized in Table 2 below. Incidentally, a short-circuit of the positive and negative electrodes had occurred in the three-electrode cell of Comparative Example 1 during the charge-and-discharge, and as a consequence, measurement results could not be obtained for neither of the output performance and life performance.

TABLE 2

| | Capacity Retention Ratio during Discharge at each Current Density (%) | | | | | | Capacity Retention Ratio after 100 Cycles (%) |
|---|---|---|---|---|---|---|---|
| | 0.2 C | 1.0 C | 2.0 C | 3.0 C | 4.0 C | 5.0 C | |
| Example 1 | 100 | 96.0 | 92.0 | 87.0 | 78.0 | 65.0 | 89.0 |
| Example 2 | 100 | 98.0 | 95.0 | 91.0 | 83.0 | 72.0 | 92.0 |
| Example 3 | 100 | 96.0 | 92.0 | 86.0 | 76.0 | 60.0 | 88.0 |

TABLE 2-continued

| | Capacity Retention Ratio during Discharge at each Current Density (%) | | | | | | Capacity Retention Ratio after 100 Cycles (%) |
|---|---|---|---|---|---|---|---|
| | 0.2 C | 1.0 C | 2.0 C | 3.0 C | 4.0 C | 5.0 C | |
| Example 4 | 100 | 96.0 | 91.0 | 84.0 | 72.0 | 55.0 | 90.0 |
| Example 5 | 100 | 99.5 | 99.0 | 98.5 | 98.0 | 97.0 | 98.0 |
| Example 6 | 100 | 100.0 | 99.5 | 99.0 | 98.5 | 98.0 | 99.0 |
| Example 7 | 100 | 99.0 | 98.0 | 97.0 | 95.5 | 94.0 | 98.0 |
| Example 8 | 100 | 98.0 | 96.0 | 93.0 | 89.0 | 84.0 | 98.0 |
| Example 9 | 100 | 99.0 | 98.5 | 97.5 | 96.0 | 94.0 | 88.0 |
| Example 10 | 100 | 99.5 | 99.0 | 98.5 | 97.5 | 96.5 | 94.0 |
| Example 11 | 100 | 98.5 | 97.0 | 95.0 | 92.0 | 88.0 | 86.0 |
| Example 12 | 100 | 98.0 | 96.0 | 94.0 | 90.0 | 84.0 | 80.0 |
| Example 13 | 100 | 96.0 | 92.0 | 87.0 | 78.0 | 65.0 | 89.0 |
| Example 14 | 100 | 96.0 | 92.0 | 86.0 | 75.0 | 60.0 | 84.0 |
| Example 15 | 100 | 97.0 | 93.0 | 88.0 | 82.0 | 67.0 | 90.0 |
| Comparative Example 1 | — | — | — | — | — | — | — |
| Comparative Example 2 | 100 | 91.0 | 79.0 | 61.0 | 37.0 | 7.0 | 45.0 |

As shown in Table 2, all of the three-electrode cells of Examples 1 to 14 was able to maintain a high capacity retention ratio even if the current density during the discharge was increased. In the three-electrode cell of Comparative Example 2, on the other hand, the capacity retention ratio fell rapidly with an increasing discharge current density.

Also, as shown in Table 2, all of the three-electrode cells of Examples 1 to 14 had a high capacity retention ratio after 100 cycles. In the three-electrode cell of Comparative Example 2, on the other hand, the capacity retention ratio after 100 cycles was less than 50% and extremely low.

A battery according to one or more embodiments or examples described above includes one or more electrode stack, the one or more electrode stack including an electrolyte layer including an electrolyte and carboxymethylcellulose sodium salt, a first electrode layer including a first active material and carboxymethylcellulose ammonium salt, and a second electrode layer including a second active material and a first binder soluble in an organic solvent, wherein the first electrode layer is bound to a first surface of the electrolyte layer and the second electrode layer is bound to a second surface of the electrolyte layer on a reverse side to the first surface. Also, a battery according to one or more embodiments or examples described above includes one or more electrode stack, the one or more electrode stack including an electrolyte layer including an electrolyte and carboxymethylcellulose ammonium salt, a first electrode layer including a first active material and a first binder soluble in an organic solvent, and a second electrode layer including a second active material and carboxymethylcellulose sodium salt, wherein the first electrode layer is bound to a first surface of the electrolyte layer and the second electrode layer is bound to a second surface of the electrolyte layer on a reverse side to the first surface. Such a battery can exhibit excellent output performance and life performance.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A battery comprising one or more electrode stack, the one or more electrode stack comprising:
    an electrolyte layer including an electrolyte and a carboxymethylcellulose sodium salt as an electrolyte layer binder;
    a first electrode layer including a first active material and a carboxymethylcellulose ammonium salt as a first electrode layer binder; and
    a second electrode layer including a second active material and a first binder, the first binder being at least one selected from the group consisting of polytetrafluoro ethylene, polyvinylidene difluoride, fluororubber, styrene-butadiene rubber, polyacrylic acid compounds, and imide compounds,
    wherein the first electrode layer is bound to a first surface of the electrolyte layer, and the second electrode layer is bound to a second surface of the electrolyte layer on a reverse side to the first surface.

2. The battery according to claim 1, wherein the one or more electrode stack further includes a current collecting layer in contact with the first electrode layer, the second electrode layer, or both the first electrode layer and second electrode layer, and the current collecting layer includes a foil including a metal or an alloy.

3. The battery according to claim 1, wherein the one or more electrode stack further includes a current collecting layer in contact with the first electrode layer, the second electrode layer, or both the first electrode layer and second electrode layer, and the current collecting layer includes a conductive agent and a second binder.

4. The battery according to claim 1, further comprising an electrode pressing member configured to press the one or more electrode stack.

5. The battery according to claim 4, further comprising a container that houses the one or more electrode stack and also serves as the electrode pressing member.

6. The battery according to claim 1, wherein the electrolyte includes an inorganic solid electrolyte.

7. A battery pack comprising the battery according to claim 1.

8. The battery pack according to claim 7, further comprising an external power distribution terminal and a protective circuit.

9. The battery pack according to claim 7 comprising a plural of the batteries, the batteries being electrically connected in series, in parallel, or in a combination of in series and in parallel.

10. A vehicle comprising the battery pack according to claim 7.

11. The vehicle according to claim 10, wherein the battery pack is configured to recover a regenerative energy of power of the vehicle.

12. The battery according to claim 1, wherein a surface shape of the electrolyte layer, a surface shape of the first electrode layer, and a surface shape of the second electrode layer mutually conform to one another.

13. The battery according to claim 1, wherein the first active material comprises one or more selected from the group consisting of a lithium-titanium oxide and a niobium oxide, or the second active material comprises one or more selected from the group consisting of the lithium-titanium oxide and the niobium oxide.

* * * * *